United States Patent
Sridharan et al.

(10) Patent No.: US 12,207,281 B2
(45) Date of Patent: Jan. 21, 2025

(54) DEMODULATION REFERENCE SIGNAL BUNDLING IN FULL-DUPLEX OPERATION

(71) Applicant: QUALCOMM Incorporated, San Diego, CA (US)

(72) Inventors: Gokul Sridharan, Sunnyvale, CA (US); Muhammad Sayed Khairy Abdelghaffar, San Jose, CA (US); Ahmed Attia Abotabl, San Diego, CA (US); Hung Dinh Ly, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/878,762

(22) Filed: Aug. 1, 2022

(65) Prior Publication Data

US 2024/0040596 A1    Feb. 1, 2024

(51) Int. Cl.
| | | |
|---|---|---|
| *H04W 72/04* | (2023.01) | |
| *H04L 5/00* | (2006.01) | |
| *H04L 5/14* | (2006.01) | |
| *H04W 72/0446* | (2023.01) | |
| *H04W 72/51* | (2023.01) | |

(52) U.S. Cl.
CPC ........... *H04W 72/51* (2023.01); *H04L 5/0012* (2013.01); *H04L 5/0051* (2013.01); *H04L 5/14* (2013.01); *H04W 72/0446* (2013.01)

(58) Field of Classification Search
CPC ............. H04W 72/51; H04W 72/0446; H04W 72/048; H04L 5/0051; H04L 5/0012; H04L 5/0048; H04L 5/14; H04L 5/16; H04L 5/1423
See application file for complete search history.

(56) References Cited

U.S. PATENT DOCUMENTS

| | | | |
|---|---|---|---|
| 2023/0131305 A1* | 4/2023 | Cozzo | H04W 72/0446 370/329 |
| 2023/0292294 A1* | 9/2023 | Rudolf | H04L 1/1858 |
| 2024/0163011 A1* | 5/2024 | Hasegawa | H04L 1/0071 |
| 2024/0179689 A1* | 5/2024 | Xiong | H04L 5/0094 |

OTHER PUBLICATIONS

"Nanxi Li et al., Coverage Enhancement for 5G NR Network: Solutions, Specification Impact and Performance Analysis, 2021, 7th International Conference on Computer and Communications, pp. 2244-2248" (Year: 2021).*

* cited by examiner

*Primary Examiner* — Rasheed Gidado

(74) *Attorney, Agent, or Firm* — Holland & Hart LLP

(57) ABSTRACT

Methods, systems, and devices for wireless communications are described. A user equipment (UE) may transmit an indication of a capability associated with maintaining phase continuity and power consistency for demodulation reference signal (DMRS) bundling between a full-duplex slot and a half-duplex slot. The UE may transmit a first signal during a first slot of a first time domain window (TDW) associated with the DMRS bundling. The UE may determine whether to terminate the first TDW based on the capability associated with maintaining the phase continuity and the power consistency between the full-duplex slot and the half-duplex slot. The UE may transmit a second signal during a second slot of the first TDW or a second TDW based on the determination of whether to terminate the first TDW.

30 Claims, 16 Drawing Sheets

DEMODULATION REFERENCE SIGNAL BUNDLING IN FULL-DUPLEX OPERATION

FIELD OF TECHNOLOGY

The following relates to wireless communications, including demodulation reference signal bundling in full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support demodulation reference signal (DMRS) bundling in full-duplex operation. For example, the described techniques to support uplink DMRS bundling with full-duplex communications, such as sub-band full-duplex communications, and half-duplex communications. A user equipment (UE) may indicate whether the UE can support maintaining phase continuity and power consistency for different scenarios of switching between a full-duplex slot and a half-duplex slot. If phase continuity and power consistency are not maintained between the slots, the UE may terminate an actual time domain window (TDW) and start a new actual TDW. In some cases, phase continuity and power consistency may not be maintained between a half-duplex slot and a full-duplex slot. In some cases, phase continuity and power consistency may be maintained when switching from a full-duplex slot to a half-duplex slot but not maintained when switching from a half-duplex slot to a full-duplex slot. In some cases, phase continuity and power consistency may be maintained across a half-duplex slot and a full-duplex slot unless there are certain conditions. For example, if there is a frequency hop between the half-duplex slot and the full-duplex slot, if the allocated frequency domain resources for the full-duplex slot are close to an edge of a bandwidth part, or if there is a time gap greater than a threshold between the half-duplex slot and the full-duplex slot, phase continuity and power consistency may not be assumed to be maintained.

A method for wireless communication at a UE is described. The method may include transmitting an indication of a capability associated with maintaining phase continuity and power consistency for DMRS bundling between a full-duplex slot and a half-duplex slot, transmitting a first signal during a first slot of a first TDW associated with the DMRS bundling, determining whether to terminate the first TDW associated with the DMRS bundling based on the capability associated with maintaining the phase continuity and the power consistency between the full-duplex slot and the half-duplex slot, and transmitting a second signal during a second slot of the first TDW or a second TDW associated with the DMRS bundling based on the determination of whether to terminate the first TDW.

An apparatus for wireless communication at a UE is described. The apparatus may include a processor, a memory coupled with the processor, where the memory includes instructions executable by the processor to cause the apparatus to transmit an indication of a capability associated with maintaining phase continuity and power consistency for DMRS bundling between a full-duplex slot and a half-duplex slot, transmit a first signal during a first slot of a first TDW associated with the DMRS bundling, determine whether to terminate the first TDW associated with the DMRS bundling based on the capability associated with maintaining the phase continuity and the power consistency between the full-duplex slot and the half-duplex slot, and transmit a second signal during a second slot of the first TDW or a second TDW associated with the DMRS bundling based on the determination of whether to terminate the first TDW.

Another apparatus for wireless communication at a UE is described. The apparatus may include means for transmitting an indication of a capability associated with maintaining phase continuity and power consistency for DMRS bundling between a full-duplex slot and a half-duplex slot, means for transmitting a first signal during a first slot of a first TDW associated with the DMRS bundling, means for determining whether to terminate the first TDW associated with the DMRS bundling based on the capability associated with maintaining the phase continuity and the power consistency between the full-duplex slot and the half-duplex slot, and means for transmitting a second signal during a second slot of the first TDW or a second TDW associated with the DMRS bundling based on the determination of whether to terminate the first TDW.

A non-transitory computer-readable medium storing code for wireless communication at a UE is described. The code may include instructions executable by a processor to transmit an indication of a capability associated with maintaining phase continuity and power consistency for DMRS bundling between a full-duplex slot and a half-duplex slot, transmit a first signal during a first slot of a first TDW associated with the DMRS bundling, determine whether to terminate the first TDW associated with the DMRS bundling based on the capability associated with maintaining the phase continuity and the power consistency between the full-duplex slot and the half-duplex slot, and transmit a second signal during a second slot of the first TDW or a second TDW associated with the DMRS bundling based on the determination of whether to terminate the first TDW.

In some examples of the method, apparatuses, and non-transitory computer-readable medium described herein, transmitting the second signal during the second slot may include operations, features, means, or instructions for terminating the first TDW based on the phase continuity and the power consistency not being maintained between the full-duplex slot and the half-duplex slot and transmitting the second signal during the second slot of the second TDW associated with the DMRS bundling based on terminating the first TDW.

In some examples of the method, apparatuses, and non-transitory computer-readable medium described herein, transmitting the second signal during the second slot may include operations, features, means, or instructions for terminating the first TDW based on the phase continuity and the power consistency not being maintained between the full-duplex slot and the half-duplex slot, where the first slot includes the half-duplex slot and the second slot includes the full-duplex slot and transmitting the second signal during the second slot of the second TDW associated with the DMRS bundling based on terminating the first TDW.

In some examples of the method, apparatuses, and non-transitory computer-readable medium described herein, transmitting the second signal during the second slot may include operations, features, means, or instructions for transmitting the second signal during the second slot of the first TDW for the DMRS bundling based on the phase continuity and the power consistency being maintained between the full-duplex slot and the half-duplex slot, where the first slot includes the full-duplex slot and the second slot includes the half-duplex slot.

In some examples of the method, apparatuses, and non-transitory computer-readable medium described herein, transmitting the second signal during the second slot may include operations, features, means, or instructions for transmitting the second signal during the second slot of the first TDW for the DMRS bundling based on phase continuity and power consistency being maintained between the full-duplex slot and the half-duplex slot.

In some examples of the method, apparatuses, and non-transitory computer-readable medium described herein, transmitting the second signal during the second slot may include operations, features, means, or instructions for terminating the first TDW based on frequency domain resources of the full-duplex slot being near an edge of a bandwidth part, where phase continuity and power consistency may be not maintained based on the frequency domain resources being located at a position of the bandwidth part that may be closer to a frequency edge of the bandwidth part than other bandwidths of the bandwidth part and transmitting the second signal during the second slot of the second TDW for the DMRS bundling based on terminating the first TDW.

In some examples of the method, apparatuses, and non-transitory computer-readable medium described herein, transmitting the second signal during the second slot may include operations, features, means, or instructions for terminating the first TDW based on frequency domain resources of the first slot or the second slot being near an edge of a bandwidth part, where phase continuity and power consistency may be not maintained based on the frequency domain resources being located at a position of the bandwidth part that may be closer to a frequency edge of the bandwidth part than other bandwidths of the bandwidth part and transmitting the second signal during the second slot of the second TDW for the DMRS bundling based on terminating the first TDW.

In some examples of the method, apparatuses, and non-transitory computer-readable medium described herein, transmitting the second signal during the second slot may include operations, features, means, or instructions for terminating the first TDW based on the full-duplex slot corresponding to a first frequency hop and the half-duplex slot corresponding to a second frequency hop, where phase continuity and power consistency may be not maintained between the first frequency hop and the second frequency hop and transmitting the second signal during the second slot of the second TDW for the DMRS bundling based on terminating the first TDW.

In some examples of the method, apparatuses, and non-transitory computer-readable medium described herein, transmitting the second signal during the second slot may include operations, features, means, or instructions for transmitting the second signal during the first slot of the second TDW for the DMRS bundling based on a time gap between the first slot and the second slot satisfying a threshold, where the phase continuity and the power consistency may be maintained across the time gap.

In some examples of the method, apparatuses, and non-transitory computer-readable medium described herein, transmitting the indication of the capability may include operations, features, means, or instructions for indicating a capability to support maintaining phase continuity and power consistency for the DMRS bundling from the full-duplex slot to the half-duplex slot or from the half-duplex slot to the full-duplex slot, or both.

In some examples of the method, apparatuses, and non-transitory computer-readable medium described herein, transmitting the indication of the capability may include operations, features, means, or instructions for transmitting the indication of the capability when connecting to a network entity.

In some examples of the method, apparatuses, and non-transitory computer-readable medium described herein, the full-duplex slot may be a sub-band full-duplex slot including one or more sub-bands of a component carrier bandwidth for uplink communication and one or more sub-bands of the component carrier bandwidth for downlink communications in a same slot.

In some examples of the method, apparatuses, and non-transitory computer-readable medium described herein, a component carrier bandwidth during the half-duplex slot includes uplink communications.

In some examples of the method, apparatuses, and non-transitory computer-readable medium described herein, the first TDW may be a first actual TDW, and the second TDW may be a second actual TDW and any set of multiple transmissions within an actual TDW maintain phase continuity and power consistency across the set of multiple transmissions.

In some examples of the method, apparatuses, and non-transitory computer-readable medium described herein, a first set of one or more DMRSs in the first signal and a second set of one or more DMRSs in the second signal may be configured for joint channel estimation based on the DMRS bundling.

A method for wireless communication at a network entity is described. The method may include receiving an indication of a UE capability associated with maintaining phase continuity and power consistency for DMRS bundling between a full-duplex slot and a half-duplex slot, receiving a first signal with a first set of DMRSs during a first slot of a first TDW associated with the DMRS bundling, receiving, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot, and decoding the first signal and the second signal based on the first set of DMRSs and the second set of DMRSs in accordance with the DMRS bundling.

An apparatus for wireless communication at a network entity is described. The apparatus may include a processor and memory coupled with the processor, where the memory includes instructions executable by the processor to cause the apparatus to receive an indication of a UE capability associated with maintaining phase continuity and power consistency for DMRS bundling between a full-duplex slot and a half-duplex slot, receive a first signal with a first set of DMRSs during a first slot of a first TDW associated with the DMRS bundling, receive, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot, and decode the first signal and the second signal based on the first set of DMRSs and the second set of DMRSs in accordance with the DMRS bundling.

Another apparatus for wireless communication at a network entity is described. The apparatus may include means for receiving an indication of a UE capability associated with maintaining phase continuity and power consistency for DMRS bundling between a full-duplex slot and a half-duplex slot, means for receiving a first signal with a first set of DMRSs during a first slot of a first TDW associated with the DMRS bundling, means for receiving, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot, and means for decoding the first signal and the second signal based on the first set of DMRSs and the second set of DMRSs in accordance with the DMRS bundling.

A non-transitory computer-readable medium storing code for wireless communication at a network entity is described. The code may include instructions executable by a processor to receive an indication of a UE capability associated with maintaining phase continuity and power consistency for DMRS bundling between a full-duplex slot and a half-duplex slot, receive a first signal with a first set of DMRSs during a first slot of a first TDW associated with the DMRS bundling, receive, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot, and decode the first signal and the second signal based on the first set of DMRSs and the second set of DMRSs in accordance with the DMRS bundling.

In some examples of the method, apparatuses, and non-transitory computer-readable medium described herein, receiving the second signal during the second slot may include operations, features, means, or instructions for receiving the second signal during the second slot of the second TDW associated with the DMRS bundling based on the phase continuity and the power consistency not being maintained between the full-duplex slot and the half-duplex slot, where the first slot includes the half-duplex slot and the second slot includes the full-duplex slot.

In some examples of the method, apparatuses, and non-transitory computer-readable medium described herein, receiving the second signal during the second slot may include operations, features, means, or instructions for receiving the second signal during the second slot of the first TDW for the DMRS bundling based on the phase continuity and the power consistency being maintained between the full-duplex slot and the half-duplex slot, where the first slot includes the full-duplex slot and the second slot includes the half-duplex slot.

In some examples of the method, apparatuses, and non-transitory computer-readable medium described herein, receiving the second signal during the second slot may include operations, features, means, or instructions for receiving the second signal during the second slot of the first TDW for the DMRS bundling based on phase continuity and power consistency being maintained between the full-duplex slot and the half-duplex slot.

In some examples of the method, apparatuses, and non-transitory computer-readable medium described herein, receiving the second signal during the second slot may include operations, features, means, or instructions for receiving the second signal during the second slot of the second TDW for the DMRS bundling based on frequency domain resources of the full-duplex slot being near an edge of a bandwidth part, where phase continuity and power consistency may be not maintained based on the frequency domain resources being located at a position of the bandwidth part that may be closer to a frequency edge of the bandwidth part than other bandwidths of the bandwidth part.

In some examples of the method, apparatuses, and non-transitory computer-readable medium described herein, receiving the second signal during the second slot may include operations, features, means, or instructions for receiving the second signal during the second slot of the second TDW for the DMRS bundling based on frequency domain resources of the first slot or the second slot being near an edge of a bandwidth part, where phase continuity and power consistency may be not maintained based on the frequency domain resources being located at a position of the bandwidth part that may be closer to a frequency edge of the bandwidth part than other bandwidths of the bandwidth part.

In some examples of the method, apparatuses, and non-transitory computer-readable medium described herein, receiving the second signal during the second slot may include operations, features, means, or instructions for receiving the second signal during the second slot of the second TDW for the DMRS bundling based on the full-duplex slot corresponding to a first frequency hop and the half-duplex slot corresponding to a second frequency hop, where phase continuity and power consistency may be not maintained between the first frequency hop and the second frequency hop.

In some examples of the method, apparatuses, and non-transitory computer-readable medium described herein, receiving the second signal during the second slot may include operations, features, means, or instructions for receiving the second signal during the second slot of the first TDW for the DMRS bundling based on a time gap between the first slot and the second slot satisfying a threshold, where the phase continuity and the power consistency may be maintained across the time gap.

In some examples of the method, apparatuses, and non-transitory computer-readable medium described herein, receiving the indication of the UE capability may include operations, features, means, or instructions for receiving an indication of a capability of a UE to support maintaining phase continuity and power consistency for the DMRS bundling from the full-duplex slot to the half-duplex slot or from the half-duplex slot to the full-duplex slot, or both.

In some examples of the method, apparatuses, and non-transitory computer-readable medium described herein, receiving the indication of the UE capability may include operations, features, means, or instructions for receiving the indication of the UE capability when a UE connects to the network entity.

In some examples of the method, apparatuses, and non-transitory computer-readable medium described herein, the full-duplex slot may be a sub-band full-duplex slot including one or more sub-bands of a component carrier bandwidth for uplink communication and one or more sub-bands of the component carrier bandwidth for downlink communications in a same slot.

In some examples of the method, apparatuses, and non-transitory computer-readable medium described herein, the first TDW may be a first actual TDW, and the second TDW may be a second actual TDW and any set of multiple transmissions within an actual TDW maintain phase continuity and power consistency across the set of multiple transmissions.

DETAILED DESCRIPTION

Figure 1:
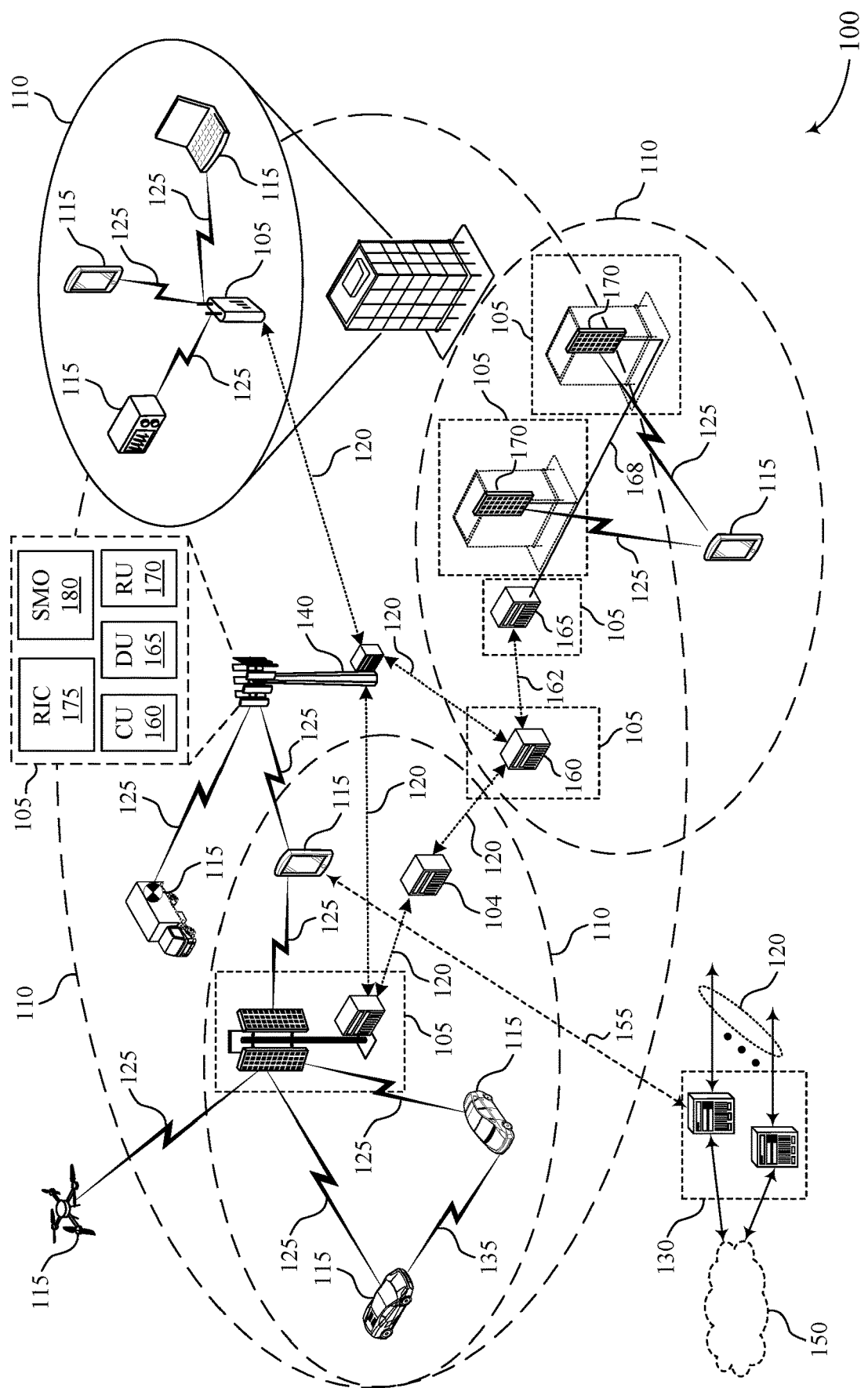
FIG. 1 illustrates an example of a wireless communications system that supports demodulation reference signal (DMRS) bundling in full-duplex operation in accordance with one or more aspects of the present disclosure.

Some wireless communications systems may support half-duplex operation, where a device either transmits or receives at one time, and full-duplex operation, where a device can transmit and receive simultaneously. In some cases, a wireless communications system may support sub-band full-duplex (SBFD) operation, where capable devices may transmit and receive simultaneously but on different and separated frequency resources (e.g., non-overlapping in the frequency domain). For example, a user equipment (UE) may transmit uplink signals on uplink resources (e.g., uplink radio frequency spectrum bands), and a network entity may receive the uplink signals on the uplink resources while transmitting downlink signals on downlink resources. In some cases, some devices may support or be configured for full-duplex operation or half-duplex operation, or both. For example, a UE may support half-duplex communications, and a network entity may support half-duplex communications and full-duplex communications.

Some wireless communications systems may also support demodulation reference signal (DMRS) bundling and frequency hopping, such as inter-slot frequency hopping. For DMRS bundling, a device may transmit a common DMRS, or DMRS with similar characteristics, across multiple transmissions or repetitions of a transmission to improve channel estimation. DMRS bundling may be performed for uplink transmission or downlink transmission. DMRS may be bundled in transmissions of multiple nominal time domain windows (TDWs), each nominal TDW including one or more actual TDWs. If there is an event that leads to a change in phase or power, the transmitting device may terminate a first actual TDW and restart a new actual TDW. For example, if there is a frequency hop between two symbols of a nominal TDW, a UE may terminate an actual TDW after the first hop and start a new actual TDW at the second hop, as the frequency hop may affect the phase continuity and transmit power of the transmission. In a system employing full-duplex techniques and half-duplex techniques, switching between a half-duplex slot and a full-duplex slot may also affect phase continuity.

The present disclosure provides techniques to support uplink DMRS bundling with full-duplex communications, such as sub-band full-duplex communications, and half-duplex communications. A UE may indicate whether the UE can support maintaining phase continuity and power consistency for different scenarios of switching between a full-duplex slot and a half-duplex slot. If phase continuity and power consistency are not maintained between the slots, the UE may terminate an actual TDW and start a new actual TDW. In some cases, phase continuity and power consistency may not be maintained between a half-duplex slot and a full-duplex slot. In some cases, phase continuity and power consistency may be maintained when switching from a full-duplex slot to a half-duplex slot but not maintained when switching from a half-duplex slot to a full-duplex slot. In some cases, phase continuity and power consistency may be maintained across a half-duplex slot and a full-duplex slot unless some conditions are present. For example, if there is a frequency hop between the half-duplex slot and the full-duplex slot, if the allocated frequency domain resources for the full-duplex slot are close to an edge of a bandwidth part, or if there is a time gap greater than a threshold between the half-duplex slot and the full-duplex slot, phase continuity and power consistency may not be maintained.

Aspects of the disclosure are initially described in the context of wireless communications systems. Aspects of the disclosure are further illustrated by and described with reference to a frequency hopping configuration, a process flow apparatus diagrams, system diagrams, and flowcharts that relate to DMRS bundling in full-duplex operation.

FIG. 1 illustrates an example of a wireless communications system 100 that supports DMRS bundling in full-duplex operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support DMRS bundling in full-duplex operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) ab solute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $\Delta_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems, such as the wireless communications system 100, may support half-duplex communications, in which a device may either transmit or receive at a single time. For example, if a network entity 105 is engaging in downlink communications, the network entity 105 may filter out any signaling that is incoming from a UE 115 via an uplink band. Additionally, or alternatively, the wireless communications system 100 may support full-duplex communications in time domain division (TDD) bands, where a device may be capable of transmission and reception simultaneously. Full-duplex communications in TDD bands may increase an uplink duty cycle, which may result in latency improvements for access and IAB links as well as improvements to uplink coverage.

In addition, full-duplex communications in TDD bands may enhance system capacity, and enable flexible and dynamic uplink and downlink resource adaptation according to uplink and downlink traffic, which may solve particular challenges of TDD communications.

In some examples, the wireless communications system 100 may support SBFD communications, in which a network entity 105 may perform simultaneous transmission of downlink signaling and reception of uplink signaling on a frequency sub-band basis (e.g., across a set of frequencies). For example, the network entity 105 may partition a particular band (e.g., 100 MHz) into sub-bands which may be used exclusively for uplink or downlink communications. For example, 40 MHz of a 100 MHz band may be used for downlink communications, 20 MHz may be used for uplink communications, and another 40 MHz may be used again for downlink communications. That is, the uplink and downlink bands may have relatively similar frequencies, however, may be non-overlapping in frequency. SBFD communications may be suitable for macro cells with a large transmit power, and may be relatively simpler to enable than other full-duplex techniques. In addition, SBFD communications may improve latency and increase uplink coverage via FDD in TDD bands.

To further enhance flexibility of some operations, the wireless communications system 100 may support UEs 115 and network entities 105 which may both perform simultaneous transmission and reception of downlink and uplink communications via partially or fully overlapping frequency bands. For example, the wireless communications system 100 may support a UE 115 and a network entity 105 that operate using full-duplex communications via partially overlapping frequency bands, or a network entity 105 that operates using half-duplex communications (e.g., in a multi-transmission reception point (mTRP)) scenario) and an UE 115 that operates using SBFD communications.

In a TDD scenario, network entities 105 in the wireless communications system 100 may support SBFD operations (e.g., where a network entity 105 may communicate simultaneously on uplink and downlink sub-bands that are non-overlapping in frequency), while UEs 115 may support half-duplex communications. For example, the network entity 105 may use a particular sub-band for transmitting downlink communications to a first UE 115, and a particular sub-band for receiving simultaneous uplink communications from a second UE 115. As such, a UE 115 capable of half-duplex communications may be paired with any network entity 105 capable of SBFD operations in the wireless communications system 100.

In some examples, the network entity 105 may use in-band full-duplex (IBFD) communications, in which the network entity 105 may transmit and receive communications with a UE 115 via a same time resource and a same frequency resource. That is, the downlink and uplink may share same IBFD time and frequency resources, which may partially or fully overlap. Alternatively, the network entity 105 may use sub-band FDD (e.g., flexible duplex) communications, in which the network entity 105 may transmit and receive communications with the UE 115 via a same time resource but via different frequency resources. That is, a frequency resource used for downlink communications may be separated from a frequency resource used for uplink communications (e.g., by a guard band).

In addition, to SBFD communications, the wireless communications system 100 may support DMRS bundling across multiple PUSCH and PUCCH repetitions. DMRS bundling may occur when DMRS are transmitted across multiple slots, where a network entity 105 may bundle the DMRSs to identify an underlying channel across the multiple slots for performing joint channel estimation across the multiple slots (e.g., joint channel estimation using DMRS symbols transmitted across various slots). A framework for the PUSCH repetitions may correspond to a Type A repetition scheme, a Type B repetition scheme, or transport block processing over multi-slot PUSCH (TBoMS). In some examples, DMRS bundling across different transport blocks may be unsupported. In addition, the DMRS bundling may be across consecutive slots, and across non-back-to-back PUSCH repetitions (e.g., where gaps smaller than 14 symbols may occur).

In a DMRS bundling procedure, a UE 115 may determine a set of nominal DMRS bundles based on a configured TDW duration. That is, a network entity 105 may configure the UE 115 to bundle DMRS transmissions across a given quantity of slots. For example, the UE 115 may transmit a total of four PUSCH repetitions, and the network entity 105 may configure the UE 115 to bundle each pair of PUSCH repetitions based on a TDW of two slots (e.g., a first nominal bundle may include first and second PUSCH repetitions, and a second nominal bundle may include third and fourth PUSCH repetitions).

Upon determining the set of nominal DMRS bundles, the UE 115 may determine one or more bundles within each nominal TDW (e.g., that spans k slots). During a nominal TDW, one or more events may occur that may lead to a change in phase continuity or power consistency. The one or more events may include intervening uplink transmissions (e.g., the UE 115 may pause PUSCH transmissions to transmit a different message), timing advance commands, downlink reception and monitoring (e.g., the UE 115 may pause PUSCH transmissions to receive a downlink message), or the like. As such, the UE 115-a may divide each nominal bundle into multiple smaller bundles. Put another way, the UE 115-a may divide the nominal TDW into multiple actual TDW windows. After an event is completed, the UE 115 may resume bundling in a subsequent slot. For example, if the four PUSCH repetitions are transmitted within the nominal TDW, the UE 115 may bundle the first and second PUSCH repetitions to form a first actual TDW, and the UE 115 may bundle the third and fourth PUSCH repetitions to form a second actual TDW, where an event may have occurred between the first and second actual TDWs.

Wireless communications systems described herein, such as the wireless communications system 100, may support uplink DMRS bundling with full-duplex communications, such as SBFD communications, and half-duplex communications. A UE 115 may indicate whether the UE 115 can support maintaining phase continuity and power consistency for different scenarios of switching between a full-duplex slot and a half-duplex slot. If phase continuity and power consistency are not maintained between the slots, the UE 115 may terminate an actual TDW and start a new actual TDW.

In some cases, phase continuity and power consistency may not be maintained between a half-duplex slot and a full-duplex slot. In some cases, phase continuity and power consistency may be maintained when switching from a full-duplex slot to a half-duplex slot but not maintained when switching from a half-duplex slot to a full-duplex slot. In some cases, phase continuity and power consistency may be maintained across a half-duplex slot and a full-duplex slot unless there are certain conditions. For example, if there is a frequency hop between the half-duplex slot and the full-duplex slot, if the frequency domain resources, or the allocated bandwidth, for the full-duplex slot are close to an edge of a bandwidth part, or if there is a time gap greater than a threshold between the half-duplex slot and the full-duplex slot, phase continuity and power consistency may not be assumed to be maintained.

Figure 2:
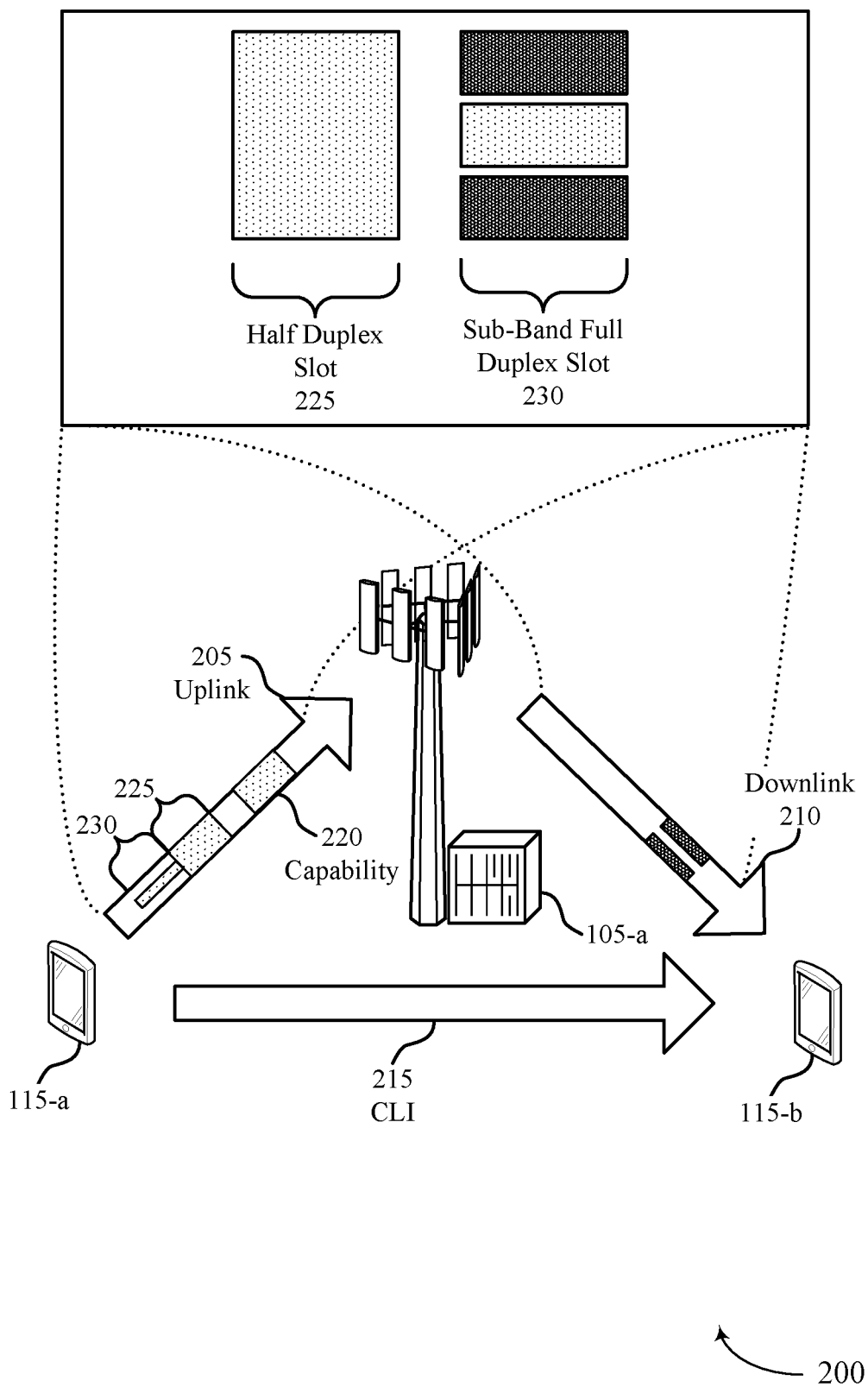
FIG. 2 illustrates an example of a wireless communications system that supports DMRS bundling in full-duplex operation in accordance with one or more aspects of the present disclosure.

FIG. 2 illustrates an example of a wireless communications system 200 that supports DMRS bundling in full-duplex operation in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, and a network entity 105-a, which may be examples of corresponding devices described herein. In some examples, the UEs 115 and the network entity 105-a may support DMRS bundling in mixed duplex operations, such as both full-duplex and half-duplex operations, which may increase the efficiency and reliability of communications in the wireless communications system 200.

The wireless communications system 200 may support communications between the UEs 115 and the network entity 105-a, where the UE 115-a and the UE 115-b may use half-duplex operation (e.g., the UEs 115 may receive downlink messages or transmit uplink messages), and the network entity 105-a may use full-duplex operation (e.g., the network entity 105-a may receive uplink messages and transmit downlink messages simultaneously). For example, the UE 115-a may transmit uplink messages to the network entity 105-a via an uplink 205, and the UE 115-b may receive downlink messages from the network entity 105-a via a downlink 210. The uplink 205 and the downlink 210 may be examples of communication links 125 described with reference to FIG. 1. In addition, the UE 115-a and the UE 115-b may experience CLI 215 (e.g., UE-to-UE interference), which may be caused by a traffic imbalance between the uplink 205 and the downlink 210 in adjacent cells. For example, power from a transmission from the UE 115-a to the network entity 105-a may be detected by the UE 115-a, which may affect reception of signaling at the UE 115-b (e.g., affect reception of downlink signaling from the network entity 105-a or another device).

In some cases, the UEs 115 and the network entity 105-a may communicate uplink and downlink messages using a half-duplex slot 225 and an SBFD slot 230. The SBFD slot 230 may include sub-bands configured for uplink signaling and downlink signaling. For example, the SBFD slot 230 may include a first sub-band configured for downlink transmissions, a second sub-band configured for uplink transmissions, and a third sub-band also configured for downlink transmissions, where the sub-bands are non-overlapping. The uplink and downlink sub-bands in the SBFD slot 230 may enable the network entity 105-a to communicate with both the UE 115-a via the uplink 205 and the UE 115-b via the downlink 210. For example, the UE 115-a may transmit uplink messages to the network entity 105-a during the half-duplex slot 225 and on one or more uplink sub-bands during the SBFD slot 230. In some cases, the UE 115-b may receive downlink signaling from the network entity 105-a using the first and third sub-bands of the SBFD slot 230 that are configured for downlink transmissions.

The wireless communications system 200 may support DMRS bundling for uplink and downlink signaling. For example, the wireless communications system 200 may support inter-slot hopping with DMRS bundling. Some additional aspects for DMRS bundling and inter-slot hopping with DMRS bundling are described in more detail with reference to FIG. 3.

In some cases, SBFD operation may enable uplink coverage enhancement. For example, by having uplink resources within downlink slots and using a sub-band dedicated for uplink coverage, UEs 115 may operate on uplink over a larger duty cycle of slots. The larger duty cycle may improve uplink coverage for UEs 115 configured to communicate during the SBFD slot 230.

The wireless communications system 200 may support techniques for DMRS bundling with full-duplex operation and half-duplex operation. For example, the wireless communications system 200 may support techniques for a UE 115 or a network entity 105, or both, to perform DMRS bundling while communicating in accordance with full-duplex operation, such as SBFD, and half-duplex operation.

For example, the UE 115 may be capable of maintaining phase continuity and power consistency across some transitions of slots, such as from an SBFD slot 230 to a half-duplex slot 225. In some cases, if the UE 115 is capable of maintaining phase continuity and power consistency across a transition of two slots, the two slots may correspond to a same actual TDW (e.g., with the exception of any other conditions which may terminate an actual TDW, such as a frequency hop, among others). In some examples, the UE 115 may not be capable of, or support, maintaining phase continuity and power consistency across other transitions of slots, such as from a half-duplex slot 225 to an SBFD slot 230. If the UE 115 is not capable of, or does not support, maintaining phase continuity and power consistency across a transition of slots, the UE 115-a may, in some cases, terminate an actual TDW at the transition and start a new actual TDW (e.g., starting with the second slot).

For example, a UE 115, such as the UE 115-a, may transmit a capability message 220 to report capabilities for whether the UE 115-a can maintain phase continuity and power consistency across a transition of slots with different duplex operations, such as between a half-duplex slot 225 and an SBFD slot 230. For example, the UE 115-a may be configured to transmit on a first slot, which may be a half-duplex slot 225, and a second, consecutive slot, which may be an SBFD slot 230. The UE 115-a may indicate whether the UE 115-a can support maintain phase continuity and power consistency between the first slot and the second slot, despite the different duplex operation of the two slots.

For example, the UE 115-a may be capable of maintaining phase continuity and power consistency for some scenarios or under some conditions, and the UE 115-a not be capable of maintaining phase continuity and power consistency for other scenarios or under other conditions. The UE 115-a may transmit signaling indicating the capability of the UE 115-a when connecting to the network (e.g., via the network entity 105-a or another network entity 105). For example, the UE 115-a may indicate support to maintain phase continuity and power consistency when going from a half-duplex slot 225 to an SBFD slot 230, or from an SBFD slot 230 to a half-duplex slot 225, or both, or neither.

In an example, the UE 115-a may not support maintaining phase continuity and power consistency when uplink transmissions or uplink transmission repetitions are scheduled across two slots with different duplex operation. For example, when PUSCH repetitions or transmissions, or PUCCH repetitions or transmissions, go across (e.g., transition from) an uplink slot (e.g., a half-duplex slot 225) to an uplink and downlink slot (e.g., an SBFD slot 230), or from an uplink and downlink slot to an uplink slot, phase continuity and power consistency may not be assumed to be maintained. The UE 115-a may transmit the capability message 220, indicating that the UE 115-a does not support maintaining phase continuity and power consistency for this case. When phase continuity and power consistency are not maintained across the transition, the UE 115-a may terminate an actual TDW at the transition, In some cases, the UE 115-a may start a new actual TDW after terminating the actual TDW at the transition. In some examples, the UE 115-a may perform these techniques at this transition regardless of whether inter-slot hopping is enabled.

In some examples, the behavior of the UE 115, such as the UE 115-a, may be based on how the transition from a half-duplex slot 225 to an SBFD slot 230 occurs. For example, when uplink repetitions or transmissions go from, or transition from, an uplink slot (e.g., a half-duplex slot 225) to an uplink and downlink slot (e.g., an SBFD slot 230), phase continuity and power consistency may not be assumed to be maintained. The UE 115-a may terminate an actual TDW at the transition and may, in some cases, start a new actual TDW at the transition. However, when uplink repetitions or transmission transition from an uplink and downlink slot to an uplink slot, phase continuity and power consistency may be assumed to be maintained. In some cases, the UE 115-a may maintain phase continuity and power consistency from an SBFD slot 230 to a half-duplex slot 225 unless other conditions are not satisfied.

Other examples or transition scenarios may similarly be supported or not supported by the UE 115-a. For example, the UE 115-a may maintain phase continuity and power consistency when going from an uplink slot to an uplink and downlink slot, but the UE 115-a may not support maintaining phase continuity and power consistency when going from an uplink and downlink slot to an uplink slot.

The capability message 220 may indicate the conditions or scenarios in which the UE 115-a supports maintain phase continuity and power consistency. For example, the capability message 220 may indicate that the UE 115-a supports maintain phase continuity and power consistency when transitioning from an uplink slot to an uplink and downlink slot, when transitioning from a downlink and uplink slot to an uplink slot, in both cases, or in neither case. The network entity 105-a, based on the capability message 220, may receive the bundled uplink transmissions from the UE 115-a based on the capabilities indicated by the capability message 220. For example, the network entity 105-a may assume that phase continuity and power consistency are maintained or not maintained for certain scenario as indicated by the capability message. For example, if the UE 115-a indicates support for maintaining phase continuity and power consistency from an uplink slot to an uplink and downlink slot, the network entity 105-a may assume that phase continuity and power consistency are maintained across the uplink slot and the uplink and downlink slot.

In some examples, phase continuity and power consistency may be maintained, or assumed to be maintained, except for some conditions. For example, when uplink repetitions or transmissions transition from a half-duplex slot 225 to an SBFD slot 230, or from an SBFD slot 230 to a half-duplex slot 225, phase continuity and power consistency may be maintained under some conditions. If phase continuity and power consistency are maintained, the UE 115-a may not terminate an actual TDW at the slot boundary of the transition, and the UE 115-a may maintain the phase continuity and power consistency across the transitioning slots. If phase continuity and power consistency are not maintained, the UE 115-*a* may terminate an actual TDW at the transition and may start a new actual TDW.

There may be one or more conditions where phase continuity and power consistency are not maintained across the slot boundary. For example, if the UE 115-*a* is scheduled to transition from a half-duplex slot 225 to an SBFD slot 230, and frequency domain resources for the SBFD slot 230, or the uplink portion of the SBFD slot 230, is close to an edge of a bandwidth part, the positioning of the frequency domain resources may affect UE transmit power settings. Therefore, the UE 115-*a* may terminate an actual TDW at the slot boundary from the half-duplex slot 225 to the SBFD slot 230 (e.g., which is close to the edge of the bandwidth part). In some cases, the UE 115-*a* may terminate the actual TDW at the slot boundary in this instance whether hopping (e.g., inter-slot hopping) is disabled or enabled, but a hop does not occur at the slot boundary.

In another example, hopping may be enabled, and a hop may occur across the slot transition. For example, the UE 115-*a* may be scheduled to transmit on a first slot using a first frequency hop and transmit on a second slot using a second frequency hop, where the first and second slots have different duplex operation. The hop may affect transmit power settings of the UE 115-*a*, and the UE 115-*a* may terminate an actual TDW at the slot boundary. In some cases, the UE 115-*a* may start a new actual TDW after the transition.

In some examples, there may be a time gap between an end of transmission on a first slot and a start of transmission on a second, next slot. The first slot and the second slot may have different duplex operation, such as the first slot being an SBFD slot 230 and the second slot being a half-duplex slot 225. For example, there may be a ten symbol PUSCH allocation occupying the first ten symbols of the first slot. The next transmission may begin in the next slot, resulting in a four symbol time gap between the transmissions. The UE 115-*a* may be able to prepare a radiofrequency chain for the second slot such that phase continuity is maintained across the gap. For example, if the time gap between transmission on a first slot and transmission on a second slot is greater than a threshold (e.g., a threshold number of symbols, slots, milliseconds, etc.), the UE 115-*a* may be able to maintain phase continuity and power consistency across the transition. Therefore, the UE 115-*a* may bundle together transmissions on the sequence of non-back-to-back transmissions across consecutive slots, enabling joint channel estimation at the network entity 105-*a*.

These techniques may enable devices in the wireless communications system 200 to support DMRS bundling when the devices communicate according to both half-duplex operation and full-duplex operation. These techniques may enable reliable DMRS bundling, as both a UE 115 and a network entity 105 may have information on actual TDWs for DMRS bundling, enabling the network entity 105 to perform joint channel estimation on bundled transmissions.

Figure 3:
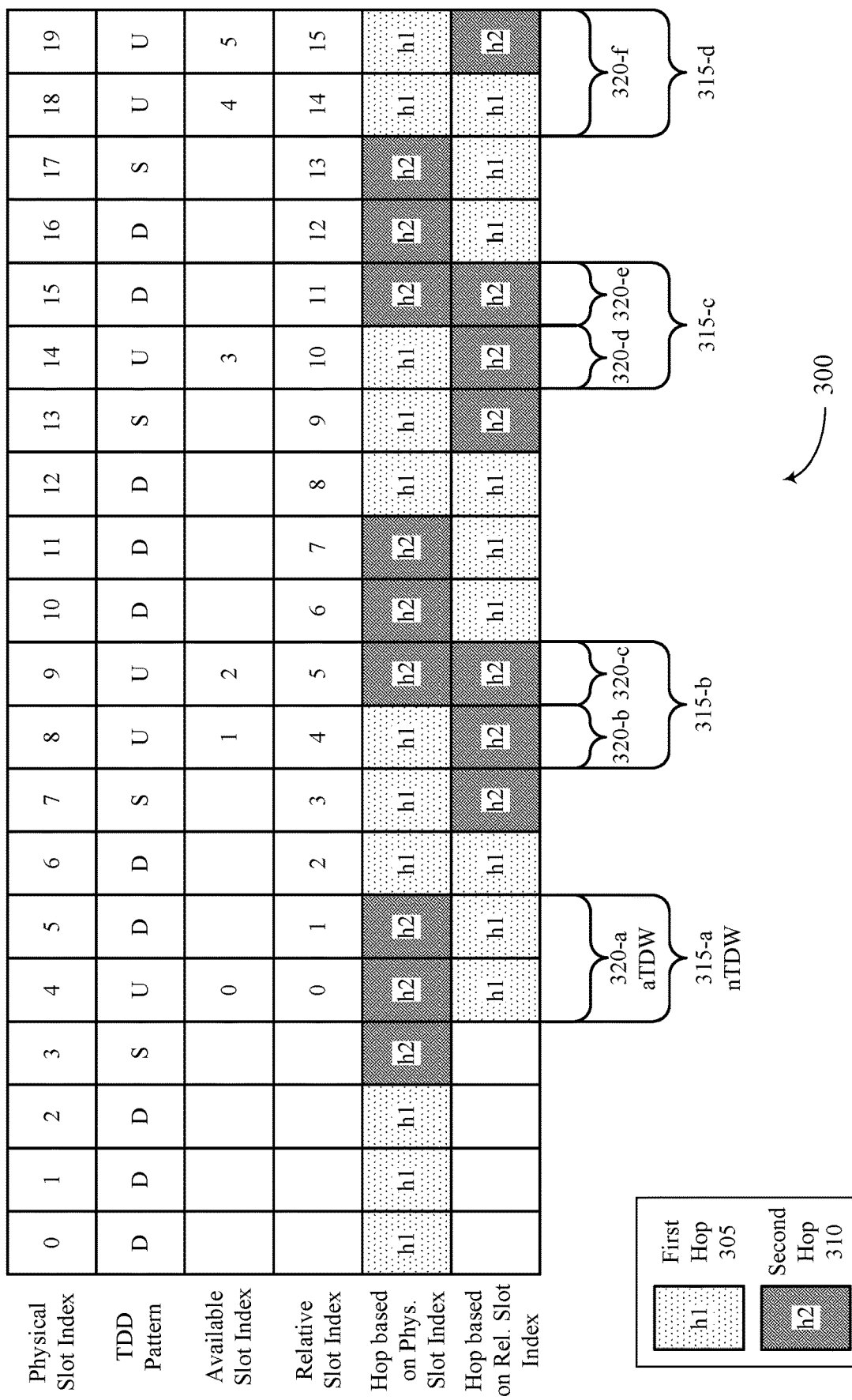
FIG. 3 illustrates an example of a frequency hopping configuration that supports DMRS bundling in full-duplex operation in accordance with one or more aspects of the present disclosure.

FIG. 3 illustrates an example of a frequency hopping configuration 300 that supports DMRS bundling in full-duplex operation in accordance with one or more aspects of the present disclosure. In some examples, the frequency hopping configuration 300 may be implemented by aspects of the wireless communications systems 100 and 200. For example, a UE may use the frequency hopping configuration 300 to determine one or more frequency hopping patterns. In addition, the UE may use the frequency hopping configuration 300 to perform available slot determination, DMRS bundling, or both, which may increase resource efficiency and improve communications between the UE and a network entity, among other benefits.

In some examples, the frequency hopping configuration 300 may be implemented by a wireless communications system that supports DMRS bundling and multiple types of duplexing for communications. For example, a UE or a network entity, or both, may communicate according to half-duplex operation and full-duplex operation while performing DMRS bundling, and the UE and the network entity may perform frequency hopping (e.g., inter-slot frequency hopping) according to the frequency hopping configuration 300.

In some cases, the frequency hopping configuration 300 may indicate a set of physical slot indices, which may include twenty physical slot indices ranging from a physical slot index of 0 to a physical slot index of 19. In addition, the frequency hopping configuration 300 may indicate a TDD pattern (e.g., a TDD slot pattern), which may indicate a slot pattern that repeats every ten slots. The slot pattern may indicate whether a particular slot may be configured for downlink communications, uplink communications, or downlink and uplink communications (e.g., a special slot). For example, the TDD pattern for slots corresponding to a slot index 0 to a slot index 9 may include, consecutively, three downlink slots (e.g., D), a special slot (e.g., S), an uplink slot (e.g., U), two downlink slots, a special slot, and two uplink slots.

At some time, the UE may receive an uplink grant to transmit uplink messages (e.g., PUSCH messages) to the network entity in a slot that is configured for uplink communications (e.g., a slot labeled "U" in the TDD pattern). The UE may perform an available slot determination procedure to determine a set of slots configured for the uplink communications and available for the uplink messages. In the example of FIG. 3, each uplink slot may be available for the uplink messages, and as such may be labeled with available slot indices 0, 1, 2, 3, 4, and 5. The available uplink slots may correspond to physical slot indices 4, 8, 9, 14, 18, and 19.

Beginning from the first uplink slot that is identified as available (e.g., the slot associated with the physical slot index 4 and the available slot index 0), the frequency hopping configuration 300 may indicate a relative slot index for each following slot. For example, the first available uplink slot may correspond to a relative slot index 0, and each subsequent slot after the first available uplink slot (e.g., including downlink, special, and uplink slots) may correspond to consecutive relative slot indices 0 through 15. As such, each slot including and after the slot associated with the physical slot index 4 may correspond to a physical slot index, an available slot index, and a relative slot index. The physical slot indices, the TDD pattern, the available slot indices, and the relative slot indices may provide a basic structure of the frequency hopping configuration 300 based on the available slot determination procedure.

In some examples, the frequency hopping configuration 300 may indicate one or more inter-slot frequency hopping patterns based on the physical slot indices, the relative slot indices, or both, and independent of DMRS bundling. Each frequency hopping pattern may include at least a first hop 305 and at least a second hop 310, where a slot for a given hop is continuous. In addition, a network entity may configure a frequency hopping duration via RRC signaling. In some examples, the UE may use the frequency hopping pattern based on the physical slot indices to transmit PUSCHs, and the frequency hopping pattern based on the relative slot indices to transmit PUCCHs. Using a given frequency hopping pattern, the UE may switch between two different resource block allocations to transmit the uplink messages to the network entity. The frequency hopping pattern based on the physical slot indices may indicate that the UE is to alternate between using the first hop 305 (e.g., h1) and the second hop 310 (e.g., h2) in sets of three slots beginning at the slot corresponding to the physical slot index 0. For example, the frequency hopping pattern based on the physical slot indices may indicate that the UE is to use the first hop 305 for a first set of three slots (e.g., corresponding to slot indices 0, 1, and 2), the second hop 310 for a second set of three slots (e.g., corresponding to slot indices 3, 4, and 5), the first hop 305 for a third set of three slots (e.g., corresponding to slot indices 6, 7, and 8) and so on for all of the slots included in the frequency hopping configuration 300.

Alternatively, the frequency hopping pattern based on the relative slot indices may indicate that the UE is to alternate between using the first hop 305 and the second hop 310 in sets of three slots beginning at the slot corresponding to the relative slot index 0 (e.g., the physical slot index 4), which may be the first available slot. For example, the frequency hopping pattern based on the relative slot indices may indicate that the UE is to use the first hop 305 for a first set of three slots (e.g., corresponding to slot indices 4, 5, and 6), the second hop 310 for a second set of three slots (e.g., corresponding to slot indices 7, 8, and 9), and so on for all of the slots included in the frequency hopping configuration 300.

Based on the identified available slots, the network entity may transmit signaling to the UE indicating for the UE to bundle a quantity of DMRSs in a nominal TDW 315 and indicating a configured TDW duration. The UE may attempt to bundle two or more DMRSs in a nominal TDW 315 that has a length (e.g., quantity of slots) equal to the configured TDW duration indicated from the network entity, where the UE may place nominal TDWs 315 independent of a frequency hopping pattern (e.g., the nominal TDWs 315 may apply to the frequency hopping patterns based on the physical slot indices and the relative slot indices). In the example of FIG. 3, because there are at most two consecutive available slots in the frequency hopping configuration 300 (e.g., slots corresponding to physical slot indices 8 and 9, and slots corresponding to physical slot indices 18 and 19), the network entity may indicate a TDW duration of two slots. Accordingly, the UE may attempt to bundle DMRS transmissions in a nominal TDW 315-*a* (e.g., including slots corresponding to the physical slot indices 4 and 5), a nominal TDW 315-*b* (e.g., including slots corresponding to the physical slot indices 8 and 9), a nominal TDW 315-*c* (e.g., including slots corresponding to the physical slot indices 14 and 15), and a nominal TDW 315-*d* (e.g., including slots corresponding to the physical slot indices 18 and 19). As such, each nominal TDW 315 may include at least one available slot for the uplink messages.

If the UE successfully bundles the DMRS transmissions in a nominal TDW 315, the nominal TDW 315 may be labeled as an actual TDW 320. For example, the UE may successfully bundle DMRSs in the nominal TDW 315-*a* across the slots corresponding to the physical slot indices 4 and 5, which may also be an actual TDW 320-*a*. Additionally, or alternatively, while the UE may have intended to bundle DMRSs across the slots corresponding to the physical slot indices 8 and 9 in the nominal TDW 315-*b*, something may prevent the UE from doing so. For example, the UE may have accommodated a relatively short SRS transmission across the slots. As the UE is unable to successfully bundle the DMRSs for the slots in the nominal TDW 315-*b*, the UE may divide the nominal TDW 315-*b* into two actual TDWs 320, including an actual TDW 320-*b* corresponding to the physical slot index 8 and an actual TDW 320-*c* corresponding to the physical slot index 9.

In some cases, the UE may be unable to successfully bundle DMRSs across the slots in the nominal TDW 315-*c* (e.g., corresponding to the physical slot indices 14 and 15), and as such, the UE may device the nominal TDW 315-*c* into two actual TDWs 320, including an actual TDW 320-*d* corresponding to the physical slot index 14 and an actual TDW 320-*e* corresponding to the physical slot index 15. Additionally, or alternatively, the UE may successfully bundle DMRSs across the slots in the nominal TDW 315-*d*, and as such, the nominal TDW 315-*d* may also be an actual TDW 320-*f* (e.g., spanning the slots corresponding to the physical slot indices 18 and 19). The actual TDWs 320 may adapt around the first hop 305 and the second hop 310. For example, if two consecutive slots use different hop indices (e.g., a first slot uses the first hop 305, and a second, consecutive slot uses the second hop 310), the UE may terminate a corresponding actual TDW 320 and determine a new actual TDW 320. As such, the UE may bundle various slots in which the UE may transmit PUSCH or PUCCH repetitions.

Determinations for an actual TDW 320 may be based on the frequency hopping configuration 300 as well as duplex operation. For example, a UE 115 may transmit a capability message indicate whether the UE can maintain phase continuity and power consistency across a transition of slots with different duplex operations, such as between a half-duplex slot and a full-duplex slot, such as an SBFD slot. In some cases, the UE may not support maintaining phase continuity and power consistency across slots with different duplex operation (e.g., from a full-duplex slot to a half-duplex slot or from a half-duplex slot to a full-duplex slot). In some cases, the UE may not support maintaining phase continuity and power consistency when transitioning from a half-duplex slot to a full-duplex slot, but the UE may support maintaining phase continuity and power consistency when transitioning from a full-duplex slot to a half-duplex slot (e.g., if both the full-duplex slot and the half-duplex slot correspond to a same frequency hop). In some cases, if frequency hopping is enabled, and there is a frequency hop (e.g., from the first hop 305 to the second hop 310 or from the second hop 310 to the first hop 305) between the full-duplex slot and the half-duplex slot, the UE may terminate an actual TDW 320 and determine a new actual TDW 320.

Figure 4:
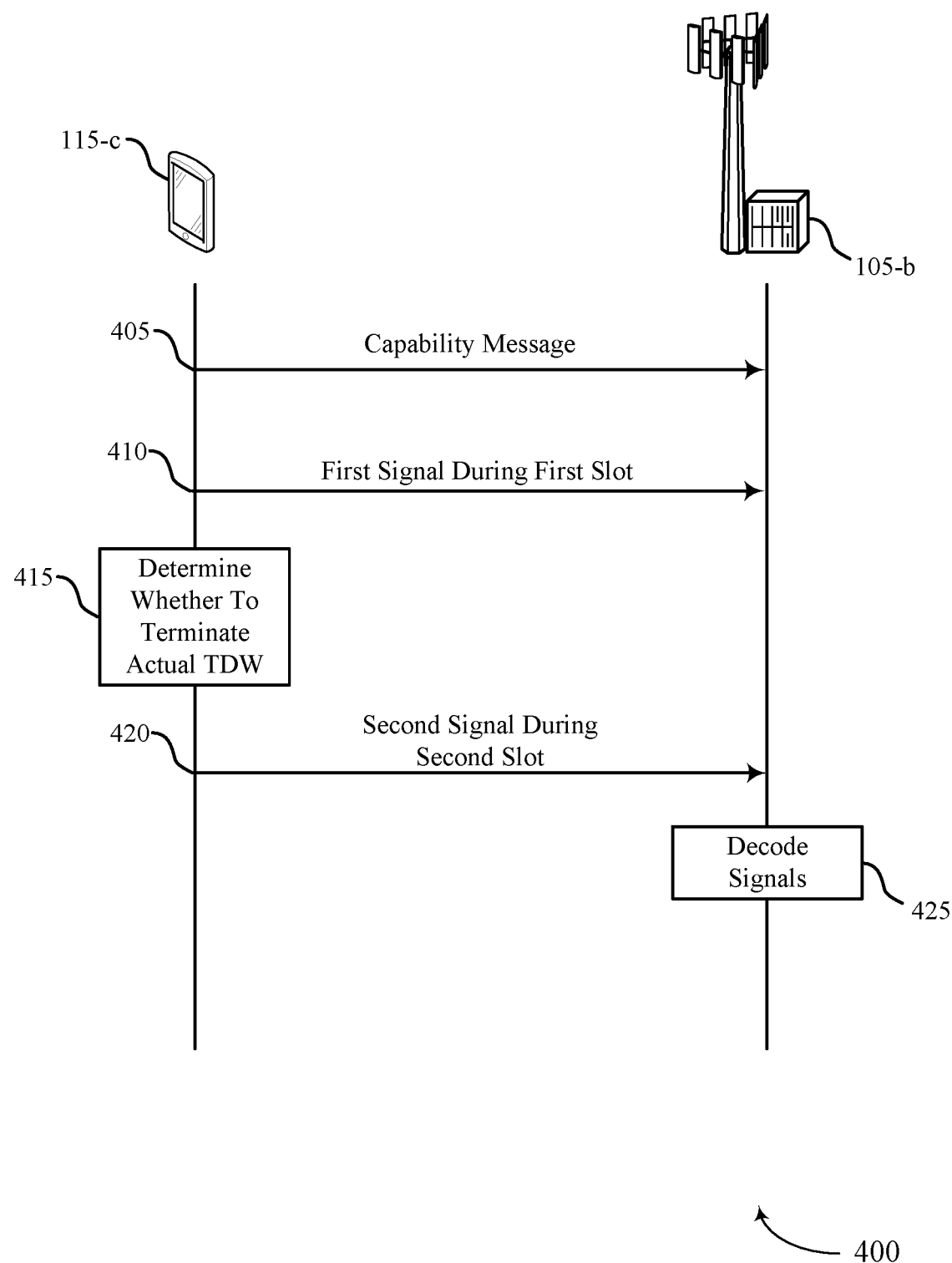
FIG. 4 illustrates an example of a process flow that supports DMRS bundling in full-duplex operation in accordance with one or more aspects of the present disclosure.

FIG. 4 illustrates an example of a process flow 400 that supports DMRS bundling in full-duplex operation in accordance with one or more aspects of the present disclosure. The process flow 400 may be implemented by a UE 115-*c* or a network entity 105-*b*, or both, which may be respective examples of a UE 115 and a network entity 105 as described with reference to FIGS. 1 and 2. In some examples, procedures or signaling shown by the process flow 400 may be performed or transmitted in a different order than shown. Additionally, or alternatively, additional signaling or procedures may be performed, or some signaling or procedures shown may not be performed, or both.

At 405, the UE 115-*c* may transmit a capability message to the network entity 105-*b*. For example, the UE 115-*c* may transmit an indication of a capability associated with maintaining phase continuity and power consistency for DMRS bundling between a full-duplex slot and a half-duplex slot. For example, the UE 115-*c* may indicate scenarios where the UE 115-c supports, or is capable of, maintaining a phase continuity and power consistency across a slot transition of a full-duplex slot and a half-duplex slot. In some examples, the UE 115-c may indicate scenarios where the UE 115-c does not support, or is not capable of, maintaining a phase continuity and power consistency across the slot transition.

For example, the UE 115-c may indicate a capability to support maintaining phase continuity and power consistency for DMRS bundling from the full-duplex slot to the half-duplex slot or from the half-duplex slot to the full-duplex slot, or both. Additionally, or alternatively, the UE 115-c may indicate that the UE 115-c does not support maintaining phase continuity and power consistency for DMRS bundling from the full-duplex slot to the half-duplex slot or from the half-duplex slot to the full-duplex slot, or both. In some examples, the UE 115-c may transmit the indication of the capability when connecting to the network entity 105-b or when connecting to a network including the network entity 105-b.

At 410, the UE 115-c may transmit a first signal during a first slot of a first TDW associated with the DMRS bundling. The first TDW may be an examples of an actual TDW or a nominal TDW, or both. The first signal may include a first set of DMRSs. For example, the network entity 105-c may receive the first signal with the first set of DMRSs during the first slot of the first TDW associated with the DMRS bundling.

At 415, the UE 115-c may determine whether to terminate the first TDW associated with the DMRS bundling based on the capability associated with maintaining the phase continuity and the power consistency between the full-duplex slot and the half-duplex slot. For example, if the first slot and the second slot correspond to a scenario where the UE 115-c supports maintaining phase continuity and power consistency across a slot transition, the UE 115-c may determine not to terminate the first TDW. If the first slot and the second slot correspond to a scenario where the UE 115-c does not support maintaining phase continuity and power consistency across a slot transition, the UE 115-c may terminate the first TDW. In some cases, the UE 115-c may start, or determine, a second (e.g., new) TDW.

At 420, the UE 115-c may transmit a second signal during a second slot of the first TDW or a second TDW associated with the DMRS bundling based on the determination of whether to terminate the first TDW. The second signal may include, or be transmitted with, a second set of DMRSs. For example, the network entity 105-c may receive, based on receiving the first signal during the first slot, a second signal with the second set of DMRSs during the second slot of the first TDW or of the second TDW associated with the DMRS bundling based on whether the phase continuity and the power consistency are maintained between the full-duplex slot and the half-duplex slot.

For example, the UE 115-c may terminate the first TDW at 415 based on the phase continuity and the power consistency not being maintained between the full-duplex slot and the half-duplex slot. At 420, the UE 115-c may transmit the second signal during the second slot of the second TDW associated with the DMRS bundling based on terminating the first TDW.

In another example, the UE 115-c may terminate the first TDW at 415 based on the phase continuity and the power consistency not being maintained between the full-duplex slot and the half-duplex slot, where the first slot corresponds to the half-duplex slot and the second slot corresponds to the full-duplex slot. At 420, the UE 115-c may transmit the second signal during the second slot of the second TDW associated with the DMRS bundling based on terminating the first TDW.

In another example, the UE 115-c may not terminate the first TDW at 415 based on the phase continuity and the power consistency being maintained between the full-duplex slot and the half-duplex slot. For example, the UE 115-c may support maintaining phase continuity and power consistency when transitioning from a half-duplex slot to a full-duplex slot. At 420, the UE 115-c may transmit the second signal during the second slot of the first TDW for the DMRS bundling based on the phase continuity and the power consistency being maintained between the full-duplex slot and the half-duplex slot.

In another example, the UE 115-c may not terminate the first TDW at 415. The UE 115-c may transmit the second signal during the second slot of the first TDW for the DMRS bundling based on phase continuity and power consistency being maintained between the full-duplex slot and the half-duplex slot.

In another example, the UE 115-c may terminate the first TDW at 415 based on frequency domain resources of the full-duplex slot being near an edge of a BWP. For example, phase continuity and power consistency may not be maintained based on the frequency domain resources being located at a position of the bandwidth part that is closer to a frequency edge of the bandwidth part than other bandwidths of the bandwidth part. At 420, the UE 115-c may transmit the second signal during the second slot of the second TDW for the DMRS bundling based on terminating the first TDW.

In another example, the UE 115-c may terminate the first TDW at 415 based on frequency domain resources of the first slot or the second slot being near an edge of a bandwidth part. In some cases, frequency domain resources that are close to an edge of a BWP in a full-duplex slot may impact UE transmit power settings. For example, phase continuity and power consistency may not be maintained based on the frequency domain resources being located at a position of the bandwidth part that is closer to a frequency edge of the bandwidth part than other bandwidths of the bandwidth part. At 420, the UE 115-c may transmit the second signal during the second slot of the second TDW for the DMRS bundling based on terminating the first TDW.

In another example, the UE 115-c may terminate the first TDW at 415 based on the full-duplex slot corresponding to a first frequency hop and the half-duplex slot corresponding to a second frequency hop. For example, phase continuity and power consistency are not maintained a frequency hop at a slot boundary (e.g., between the first frequency hop and the second frequency hop). At 420, the UE 115-c may transmit the second signal during the second slot of the second TDW for the DMRS bundling based on terminating the first TDW.

In some examples, there may be a time gap between an end of transmission on the first slot and a beginning of transmission on the second slot. The UE 115-c may be able to prepare a radiofrequency chain for the second slot such that phase continuity is maintained. For example, the UE 115-c may not terminate the first TDW at 415 based on a time gap between transmission during the first slot and transmission on the second slot satisfying a threshold. At 420, the UE 115-c may transmit the second signal during the second slot of the first TDW for the DMRS bundling based on a time gap between the first slot and the second slot satisfying a threshold, where the phase continuity and the power consistency are maintained across the time gap.

At 425, the network entity 105-b may decode the first signal or the second signal, or both. For example, the network entity 105-b may decode the first signal and the second signal based on the first set of DMRSs and the second set of DMRSs in accordance with the DMRS bundling. In some examples, the network entity 105-b may perform joint channel estimation based on the first set of DMRS and the second set of DMRS. For example, if DMRS of the first signal are bundled with DMRS of the second signal, the network entity 105-b may perform joint channel estimation on both signals to provide enhanced, or more accurate, channel estimation.

Figure 5:
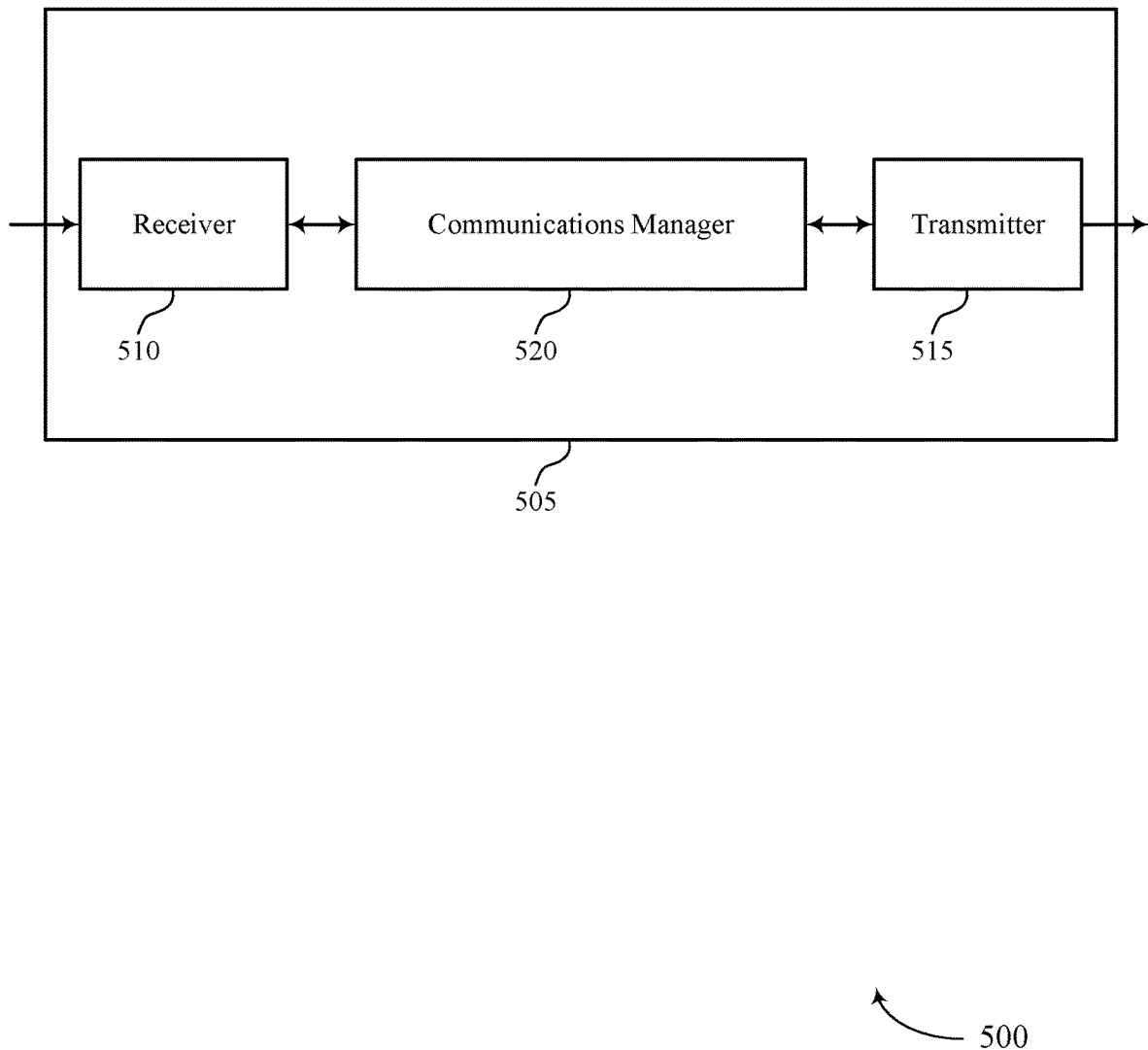
FIGS. 5 and 6 show block diagrams of devices that support DMRS bundling in full-duplex operation in accordance with one or more aspects of the present disclosure.

FIG. 5 shows a block diagram 500 of a device 505 that supports DMRS bundling in full-duplex operation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to DMRS bundling in full-duplex operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to DMRS bundling in full-duplex operation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of DMRS bundling in full-duplex operation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for transmitting an indication of a capability associated with maintaining phase continuity and power consistency for DMRS bundling between a full-duplex slot and a half-duplex slot. The communications manager 520 may be configured as or otherwise support a means for transmitting a first signal during a first slot of a first TDW associated with the DMRS bundling. The communications manager 520 may be configured as or otherwise support a means for determining whether to terminate the first TDW associated with the DMRS bundling based on the capability associated with maintaining the phase continuity and the power consistency between the full-duplex slot and the half-duplex slot. The communications manager 520 may be configured as or otherwise support a means for transmitting a second signal during a second slot of the first TDW or a second TDW associated with the DMRS bundling based on the determination of whether to terminate the first TDW.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for enhanced channel estimation using DMRS bundling in a system employing multiple duplex operations. These techniques may support DMRS bundling with SBFD, where SBFD may provide uplink coverage enhancement based on a larger duty cycle of slots.

Figure 6:
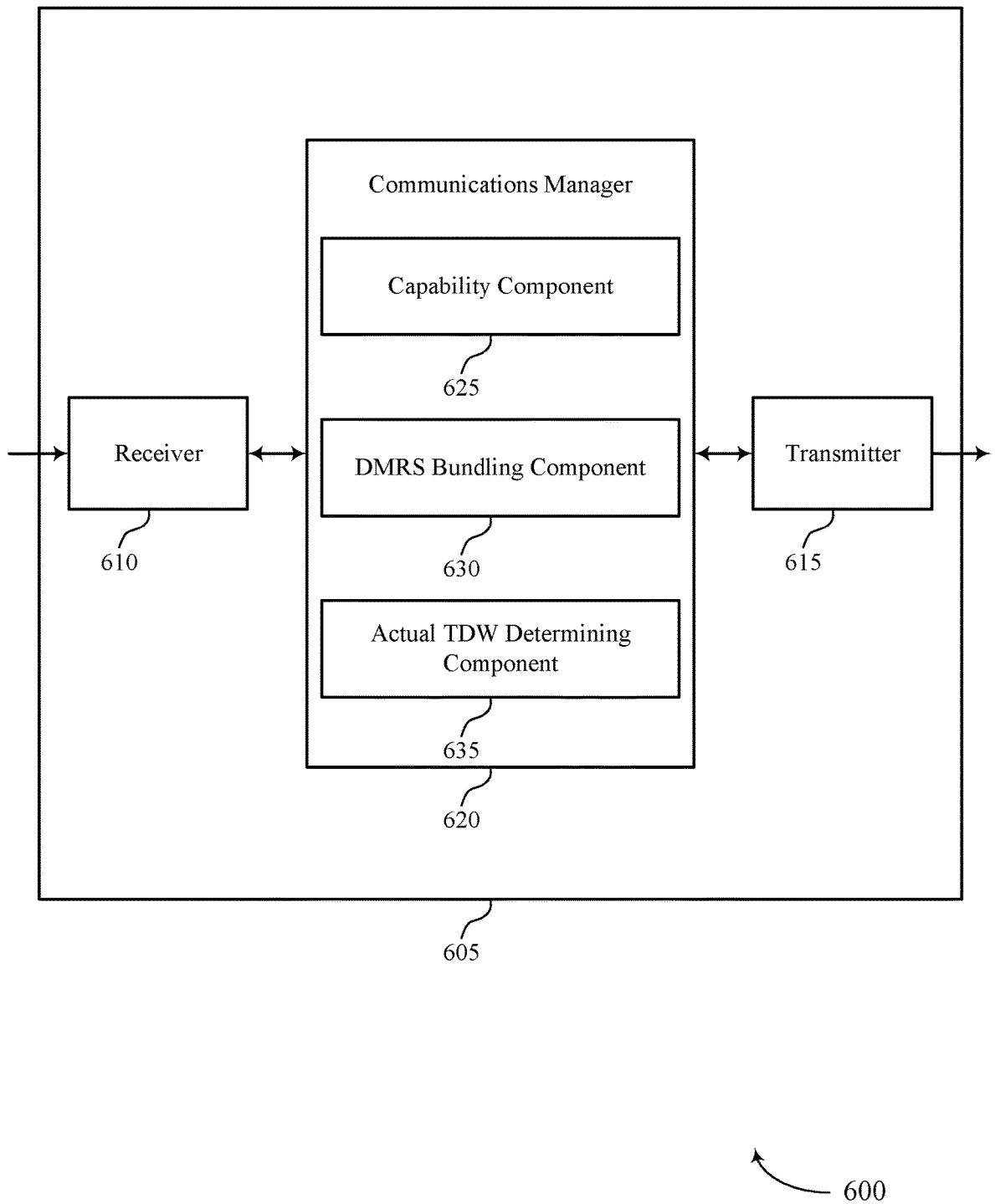

FIG. 6 shows a block diagram 600 of a device 605 that supports DMRS bundling in full-duplex operation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to DMRS bundling in full-duplex operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to DMRS bundling in full-duplex operation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of DMRS bundling in full-duplex operation as described herein. For example, the communications manager 620 may include a capability component 625, a DMRS bundling component 630, an actual TDW determining component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The capability component 625 may be configured as or otherwise support a means for transmitting an indication of a capability associated with maintaining phase continuity and power consistency for DMRS bundling between a full-duplex slot and a half-duplex slot. The DMRS bundling component 630 may be configured as or otherwise support a means for transmitting a first signal during a first slot of a first TDW associated with the DMRS bundling. The actual TDW determining component 635 may be configured as or otherwise support a means for determining whether to terminate the first TDW associated with the DMRS bundling based on the capability associated with maintaining the phase continuity and the power consistency between the full-duplex slot and the half-duplex slot. The DMRS bundling component 630 may be configured as or otherwise support a means for transmitting a second signal during a second slot of the first TDW or a second TDW associated with the DMRS bundling based on the determination of whether to terminate the first TDW.

Figure 7:
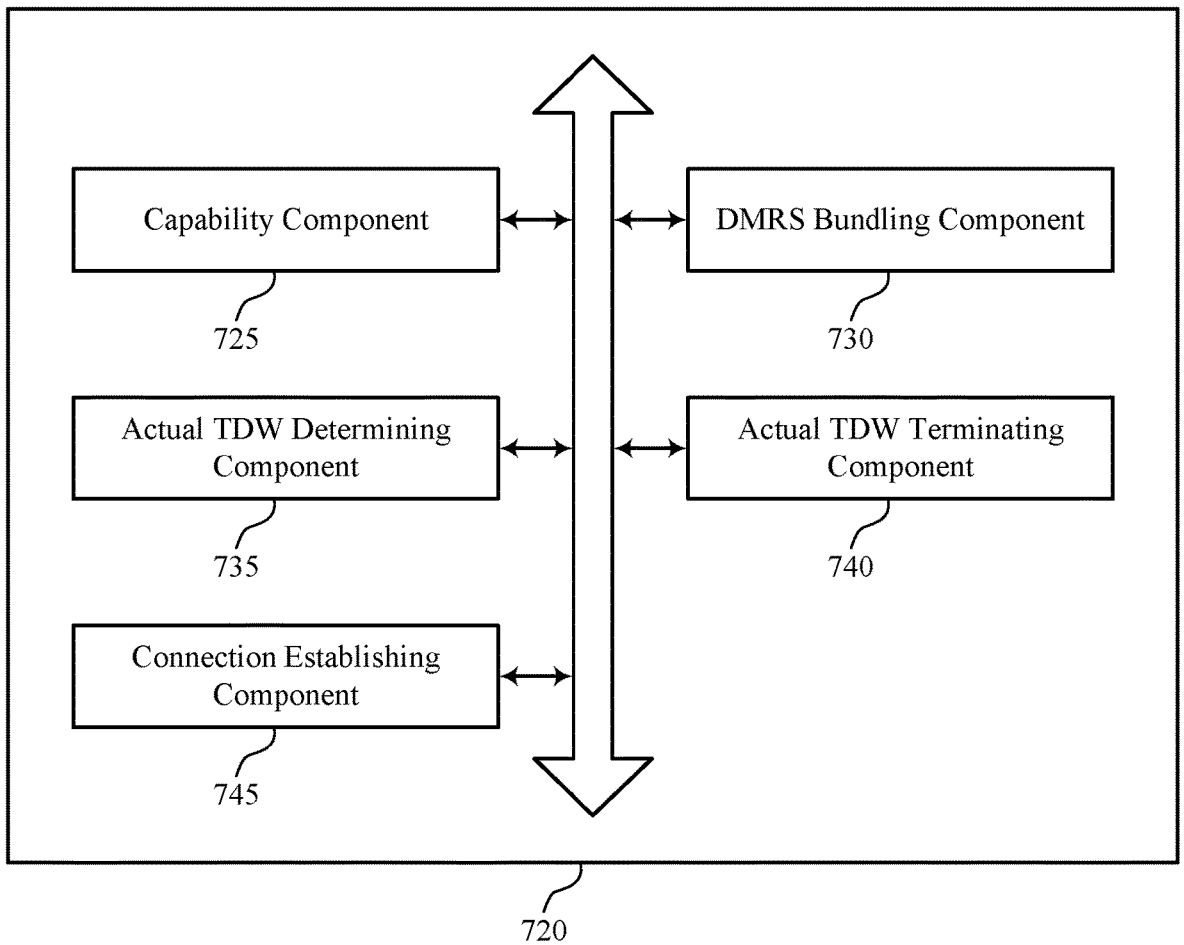
FIG. 7 shows a block diagram of a communications manager that supports DMRS bundling in full-duplex operation in accordance with one or more aspects of the present disclosure.

FIG. 7 shows a block diagram 700 of a communications manager 720 that supports DMRS bundling in full-duplex operation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of DMRS bundling in full-duplex operation as described herein. For example, the communications manager 720 may include a capability component 725, a DMRS bundling component 730, an actual TDW determining component 735, an actual TDW terminating component 740, a connection establishing component 745, or any combination thereof. Each of these components may communicate, directly or indirectly, with one another (e.g., via one or more buses).

The communications manager 720 may support wireless communication at a UE in accordance with examples as disclosed herein. The capability component 725 may be configured as or otherwise support a means for transmitting an indication of a capability associated with maintaining phase continuity and power consistency for DMRS bundling between a full-duplex slot and a half-duplex slot. The DMRS bundling component 730 may be configured as or otherwise support a means for transmitting a first signal during a first slot of a first TDW associated with the DMRS bundling. The actual TDW determining component 735 may be configured as or otherwise support a means for determining whether to terminate the first TDW associated with the DMRS bundling based on the capability associated with maintaining the phase continuity and the power consistency between the full-duplex slot and the half-duplex slot. In some examples, the DMRS bundling component 730 may be configured as or otherwise support a means for transmitting a second signal during a second slot of the first TDW or a second TDW associated with the DMRS bundling based on the determination of whether to terminate the first TDW.

In some examples, to support transmitting the second signal during the second slot, the actual TDW terminating component 740 may be configured as or otherwise support a means for terminating the first TDW based on the phase continuity and the power consistency not being maintained between the full-duplex slot and the half-duplex slot. In some examples, to support transmitting the second signal during the second slot, the DMRS bundling component 730 may be configured as or otherwise support a means for transmitting the second signal during the second slot of the second TDW associated with the DMRS bundling based on terminating the first TDW.

In some examples, to support transmitting the second signal during the second slot, the actual TDW terminating component 740 may be configured as or otherwise support a means for terminating the first TDW based on the phase continuity and the power consistency not being maintained between the full-duplex slot and the half-duplex slot, where the first slot includes the half-duplex slot and the second slot includes the full-duplex slot. In some examples, to support transmitting the second signal during the second slot, the DMRS bundling component 730 may be configured as or otherwise support a means for transmitting the second signal during the second slot of the second TDW associated with the DMRS bundling based on terminating the first TDW.

In some examples, to support transmitting the second signal during the second slot, the DMRS bundling component 730 may be configured as or otherwise support a means for transmitting the second signal during the second slot of the first TDW for the DMRS bundling based on the phase continuity and the power consistency being maintained between the full-duplex slot and the half-duplex slot, where the first slot includes the full-duplex slot and the second slot includes the half-duplex slot.

In some examples, to support transmitting the second signal during the second slot, the DMRS bundling component 730 may be configured as or otherwise support a means for transmitting the second signal during the second slot of the first TDW for the DMRS bundling based on phase continuity and power consistency being maintained between the full-duplex slot and the half-duplex slot.

In some examples, to support transmitting the second signal during the second slot, the actual TDW terminating component 740 may be configured as or otherwise support a means for terminating the first TDW based on frequency domain resources of the full-duplex slot being near an edge of a bandwidth part, where phase continuity and power consistency are not maintained based on the frequency domain resources being located at a position of the bandwidth part that is closer to a frequency edge of the bandwidth part than other bandwidths of the bandwidth part. In some examples, to support transmitting the second signal during the second slot, the DMRS bundling component 730 may be configured as or otherwise support a means for transmitting the second signal during the second slot of the second TDW for the DMRS bundling based on terminating the first TDW.

In some examples, to support transmitting the second signal during the second slot, the actual TDW terminating component 740 may be configured as or otherwise support a means for terminating the first TDW based on frequency domain resources of the first slot or the second slot being near an edge of a bandwidth part, where phase continuity and power consistency are not maintained based on the frequency domain resources being located at a position of the bandwidth part that is closer to a frequency edge of the bandwidth part than other bandwidths of the bandwidth part. In some examples, to support transmitting the second signal during the second slot, the DMRS bundling component 730 may be configured as or otherwise support a means for transmitting the second signal during the second slot of the second TDW for the DMRS bundling based on terminating the first TDW.

In some examples, to support transmitting the second signal during the second slot, the actual TDW terminating component 740 may be configured as or otherwise support a means for terminating the first TDW based on the full-duplex slot corresponding to a first frequency hop and the half-duplex slot corresponding to a second frequency hop, where phase continuity and power consistency are not maintained between the first frequency hop and the second frequency hop. In some examples, to support transmitting the second signal during the second slot, the DMRS bundling component 730 may be configured as or otherwise support a means for transmitting the second signal during the second slot of the second TDW for the DMRS bundling based on terminating the first TDW.

In some examples, to support transmitting the second signal during the second slot, the DMRS bundling component 730 may be configured as or otherwise support a means for transmitting the second signal during the second slot of the first TDW for the DMRS bundling based on a time gap between the first slot and the second slot satisfying a threshold, where the phase continuity and the power consistency are maintained across the time gap.

In some examples, to support transmitting the indication of the capability, the capability component 725 may be configured as or otherwise support a means for indicating a capability to support maintaining phase continuity and power consistency for the DMRS bundling from the full-duplex slot to the half-duplex slot or from the half-duplex slot to the full-duplex slot, or both.

In some examples, to support transmitting the indication of the capability, the connection establishing component 745 may be configured as or otherwise support a means for transmitting the indication of the capability when connecting to a network entity.

In some examples, the full-duplex slot is a sub-band full-duplex slot including one or more sub-bands of a component carrier bandwidth for uplink communication and one or more sub-bands of the component carrier bandwidth for downlink communications in a same slot.

In some examples, a component carrier bandwidth during the half-duplex slot includes uplink communications.

In some examples, the first TDW is a first actual TDW, and the second TDW is a second actual TDW. In some examples, any transmissions within an actual TDW maintain phase continuity and power consistency across the transmissions.

In some examples, a first set of one or more DMRSs in the first signal and a second set of one or more DMRSs in the second signal are configured for joint channel estimation based on the DMRS bundling.

Figure 8:
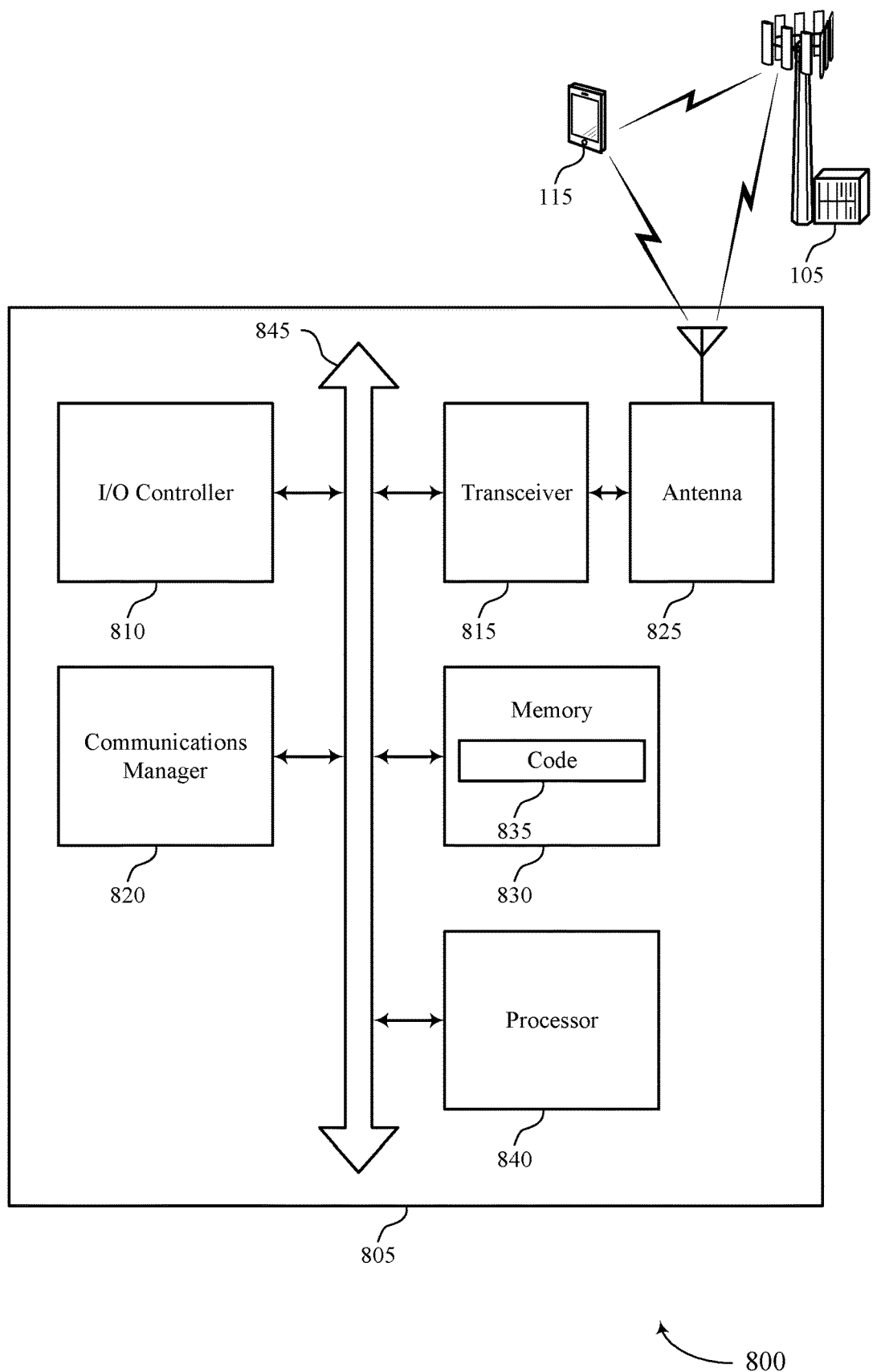
FIG. 8 shows a diagram of a system including a device that supports DMRS bundling in full-duplex operation in accordance with one or more aspects of the present disclosure.

FIG. 8 shows a diagram of a system 800 including a device 805 that supports DMRS bundling in full-duplex operation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting DMRS bundling in full-duplex operation). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting an indication of a capability associated with maintaining phase continuity and power consistency for DMRS bundling between a full-duplex slot and a half-duplex slot. The communications manager 820 may be configured as or otherwise support a means for transmitting a first signal during a first slot of a first TDW associated with the DMRS bundling. The communications manager 820 may be configured as or otherwise support a means for determining whether to terminate the first TDW associated with the DMRS bundling based on the capability associated with maintaining the phase continuity and the power consistency between the full-duplex slot and the half-duplex slot. The communications manager 820 may be configured as or otherwise support a means for transmitting a second signal during a second slot of the first TDW or a second TDW associated with the DMRS bundling based on the determination of whether to terminate the first TDW.

By including or configuring the communications manager 820 in accordance with examples as described herein, the device 805 may support techniques for improved coordination between devices by indicating when DMRS bundling can be supported in a system that employs multiple duplex operations. For example, these techniques may provide enhanced channel estimation using DMRS bundling in a system that supports SBFD and half-duplex operation by informing a network entity 105 how a UE 115 can support DMRS bundling.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of DMRS bundling in full-duplex operation as described herein, or the processor 840 and the memory 830 may be otherwise configured to perform or support such operations.

Figure 9:
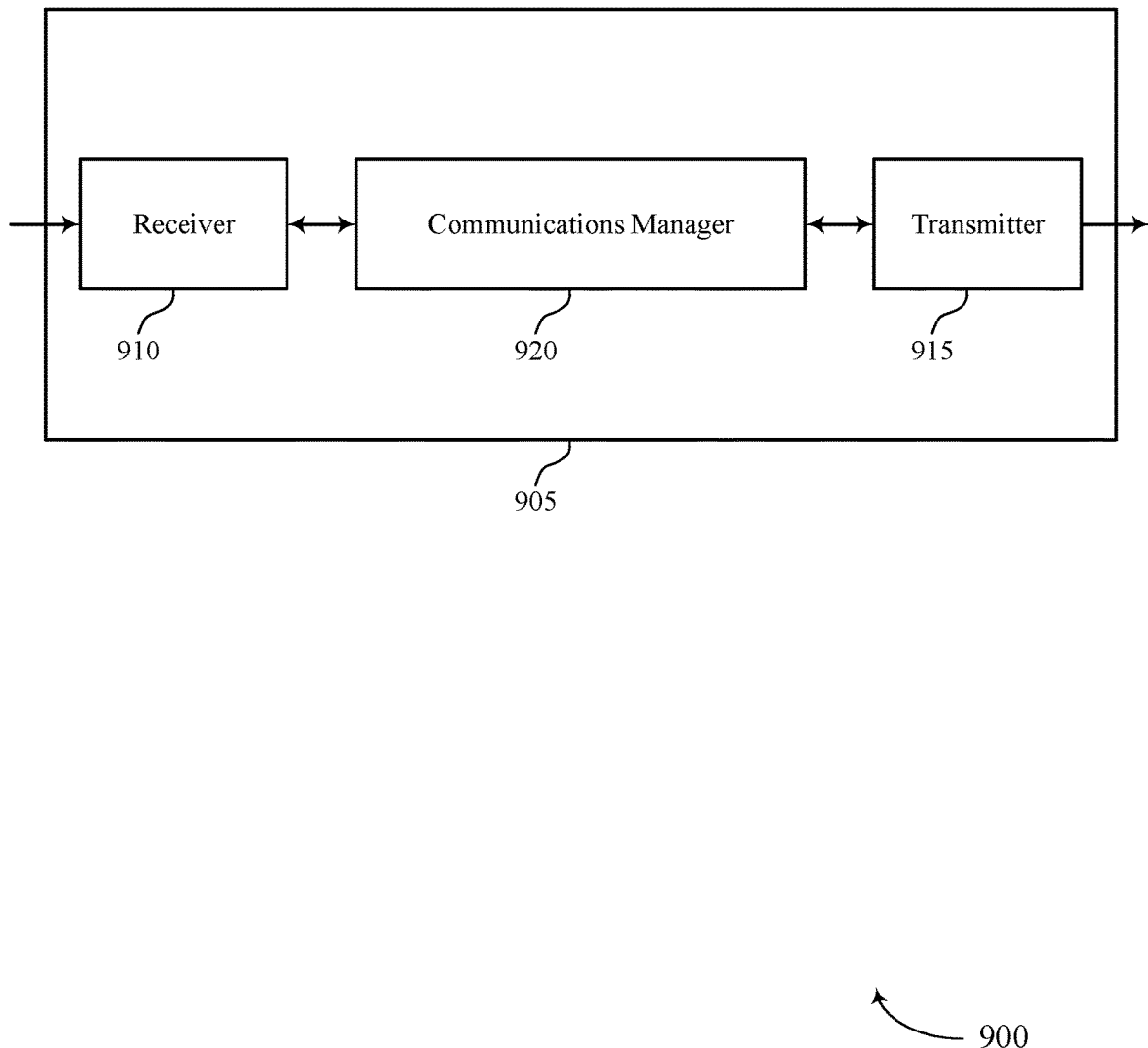
FIGS. 9 and 10 show block diagrams of devices that support DMRS bundling in full-duplex operation in accordance with one or more aspects of the present disclosure.

FIG. 9 shows a block diagram 900 of a device 905 that supports DMRS bundling in full-duplex operation in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of DMRS bundling in full-duplex operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for receiving an indication of a UE capability associated with maintaining phase continuity and power consistency for DMRS bundling between a full-duplex slot and a half-duplex slot. The communications manager 920 may be configured as or otherwise support a means for receiving a first signal with a first set of DMRSs during a first slot of a first TDW associated with the DMRS bundling. The communications manager 920 may be configured as or otherwise support a means for receiving, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot. The communications manager 920 may be configured as or otherwise support a means for decoding the first signal and the second signal based on the first set of DMRSs and the second set of DMRSs in accordance with the DMRS bundling.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for enhanced channel estimation using DMRS bundling in a system employing multiple duplex operations. These techniques may support DMRS bundling with SBFD, where SBFD may provide uplink coverage enhancement based on a larger duty cycle of slots.

Figure 10:
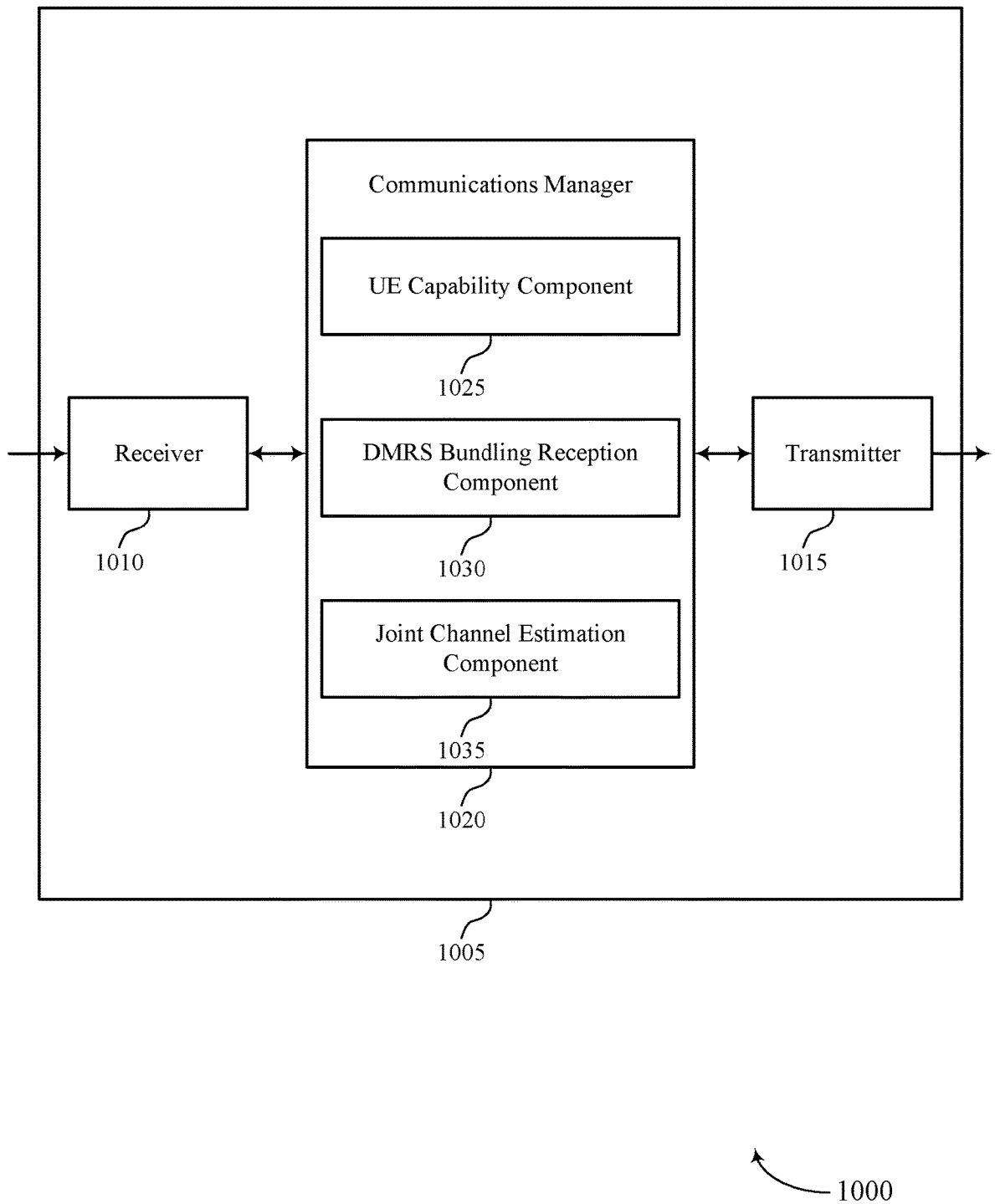

FIG. 10 shows a block diagram 1000 of a device 1005 that supports DMRS bundling in full-duplex operation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of DMRS bundling in full-duplex operation as described herein. For example, the communications manager 1020 may include a UE capability component 1025, a DMRS bundling reception component 1030, a joint channel estimation component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The UE capability component 1025 may be configured as or otherwise support a means for receiving an indication of a UE capability associated with maintaining phase continuity and power consistency for DMRS bundling between a full-duplex slot and a half-duplex slot. The DMRS bundling reception component 1030 may be configured as or otherwise support a means for receiving a first signal with a first set of DMRSs during a first slot of a first TDW associated with the DMRS bundling. The DMRS bundling reception component 1030 may be configured as or otherwise support a means for receiving, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot. The joint channel estimation component 1035 may be configured as or otherwise support a means for decoding the first signal and the second signal based on the first set of DMRSs and the second set of DMRSs in accordance with the DMRS bundling.

Figure 11:
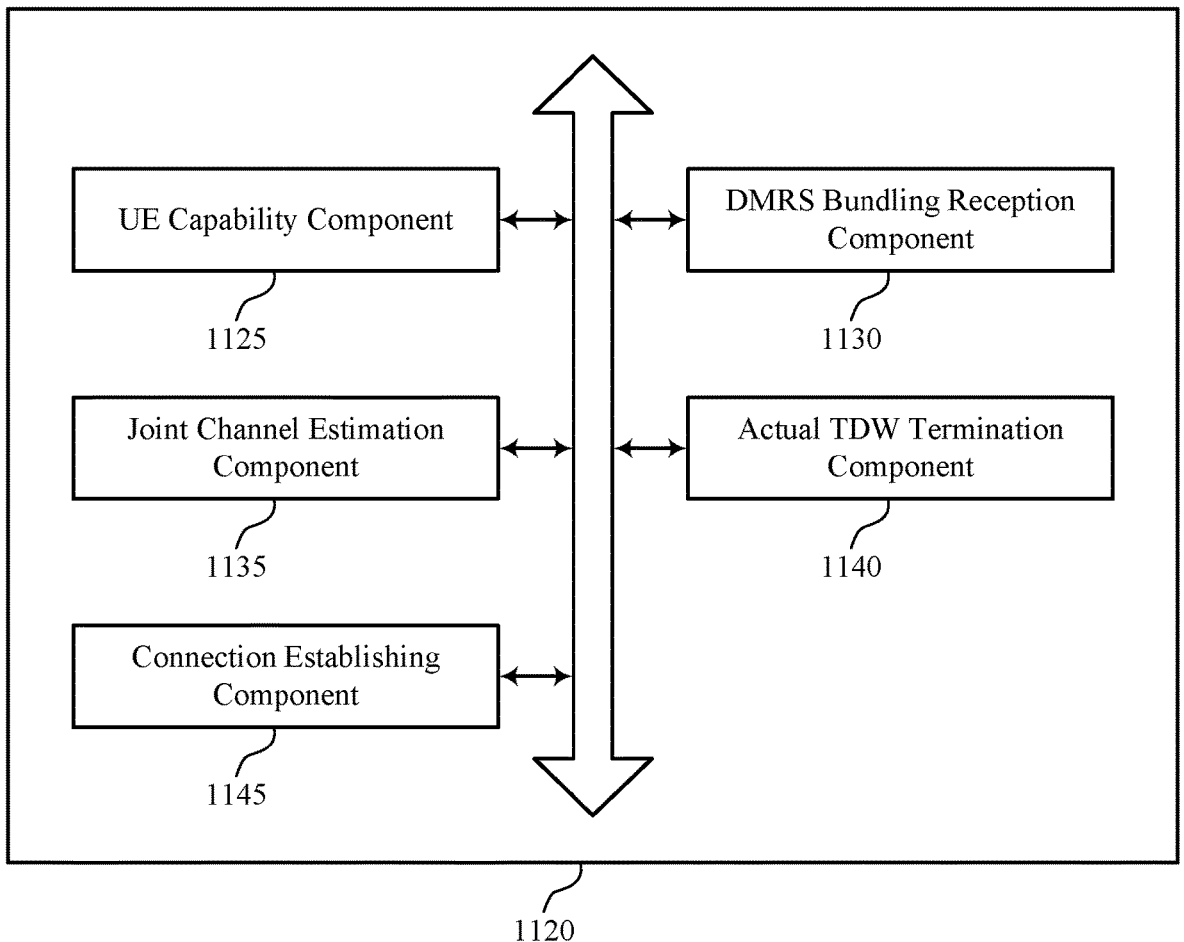
FIG. 11 shows a block diagram of a communications manager that supports DMRS bundling in full-duplex operation in accordance with one or more aspects of the present disclosure.

FIG. 11 shows a block diagram 1100 of a communications manager 1120 that supports DMRS bundling in full-duplex operation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of DMRS bundling in full-duplex operation as described herein. For example, the communications manager 1120 may include a UE capability component 1125, a DMRS bundling reception component 1130, a joint channel estimation component 1135, an actual TDW termination component 1140, a connection establishing component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The UE capability component 1125 may be configured as or otherwise support a means for receiving an indication of a UE capability associated with maintaining phase continuity and power consistency for DMRS bundling between a full-duplex slot and a half-duplex slot. The DMRS bundling reception component 1130 may be configured as or otherwise support a means for receiving a first signal with a first set of DMRSs during a first slot of a first TDW associated with the DMRS bundling. In some examples, the DMRS bundling reception component 1130 may be configured as or otherwise support a means for receiving, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot. The joint channel estimation component 1135 may be configured as or otherwise support a means for decoding the first signal and the second signal based on the first set of DMRSs and the second set of DMRSs in accordance with the DMRS bundling.

In some examples, to support receiving the second signal during the second slot, the actual TDW termination component 1140 may be configured as or otherwise support a means for receiving the second signal during the second slot of the second TDW associated with the DMRS bundling based on the phase continuity and the power consistency not being maintained between the full-duplex slot and the half-duplex slot.

In some examples, to support receiving the second signal during the second slot, the actual TDW termination component 1140 may be configured as or otherwise support a means for receiving the second signal during the second slot of the second TDW associated with the DMRS bundling based on the phase continuity and the power consistency not being maintained between the full-duplex slot and the half-duplex slot, where the first slot includes the half-duplex slot and the second slot includes the full-duplex slot.

In some examples, to support receiving the second signal during the second slot, the DMRS bundling reception component 1130 may be configured as or otherwise support a means for receiving the second signal during the second slot of the first TDW for the DMRS bundling based on the phase continuity and the power consistency being maintained between the full-duplex slot and the half-duplex slot, where the first slot includes the full-duplex slot and the second slot includes the half-duplex slot.

In some examples, to support receiving the second signal during the second slot, the DMRS bundling reception component 1130 may be configured as or otherwise support a means for receiving the second signal during the second slot of the first TDW for the DMRS bundling based on phase continuity and power consistency being maintained between the full-duplex slot and the half-duplex slot.

In some examples, to support receiving the second signal during the second slot, the actual TDW termination component 1140 may be configured as or otherwise support a means for receiving the second signal during the second slot of the second TDW for the DMRS bundling based on frequency domain resources of the full-duplex slot being near an edge of a bandwidth part, where phase continuity and power consistency are not maintained based on the frequency domain resources being located at a position of the bandwidth part that is closer to a frequency edge of the bandwidth part than other bandwidths of the bandwidth part.

In some examples, to support receiving the second signal during the second slot, the actual TDW termination component 1140 may be configured as or otherwise support a means for receiving the second signal during the second slot of the second TDW for the DMRS bundling based on frequency domain resources of the first slot or the second slot being near an edge of a bandwidth part, where phase continuity and power consistency are not maintained based on the being located at a position of the bandwidth part that is closer to a frequency edge of the bandwidth part than other bandwidths of the bandwidth part.

In some examples, to support receiving the second signal during the second slot, the actual TDW termination component 1140 may be configured as or otherwise support a means for receiving the second signal during the second slot of the second TDW for the DMRS bundling based on the full-duplex slot corresponding to a first frequency hop and the half-duplex slot corresponding to a second frequency hop, where phase continuity and power consistency are not maintained between the first frequency hop and the second frequency hop.

In some examples, to support receiving the second signal during the second slot, the DMRS bundling reception component 1130 may be configured as or otherwise support a means for receiving the second signal during the second slot of the first TDW for the DMRS bundling based on a time gap between the first slot and the second slot satisfying a threshold, where the phase continuity and the power consistency are maintained across the time gap.

In some examples, to support receiving the indication of the UE capability, the UE capability component 1125 may be configured as or otherwise support a means for receiving an indication of a capability of a UE to support maintaining phase continuity and power consistency for the DMRS bundling from the full-duplex slot to the half-duplex slot or from the half-duplex slot to the full-duplex slot, or both.

In some examples, to support receiving the indication of the UE capability, the connection establishing component 1145 may be configured as or otherwise support a means for receiving the indication of the UE capability when a UE connects to the network entity.

In some examples, the full-duplex slot is a sub-band full-duplex slot including one or more sub-bands of a component carrier bandwidth for uplink communication and one or more sub-bands of the component carrier bandwidth for downlink communications in a same slot.

In some examples, the first TDW is a first actual TDW, and the second TDW is a second actual TDW. In some examples, transmissions within a TDW (e.g., an actual TDW) maintain phase continuity and power consistency across the transmissions.

Figure 12:
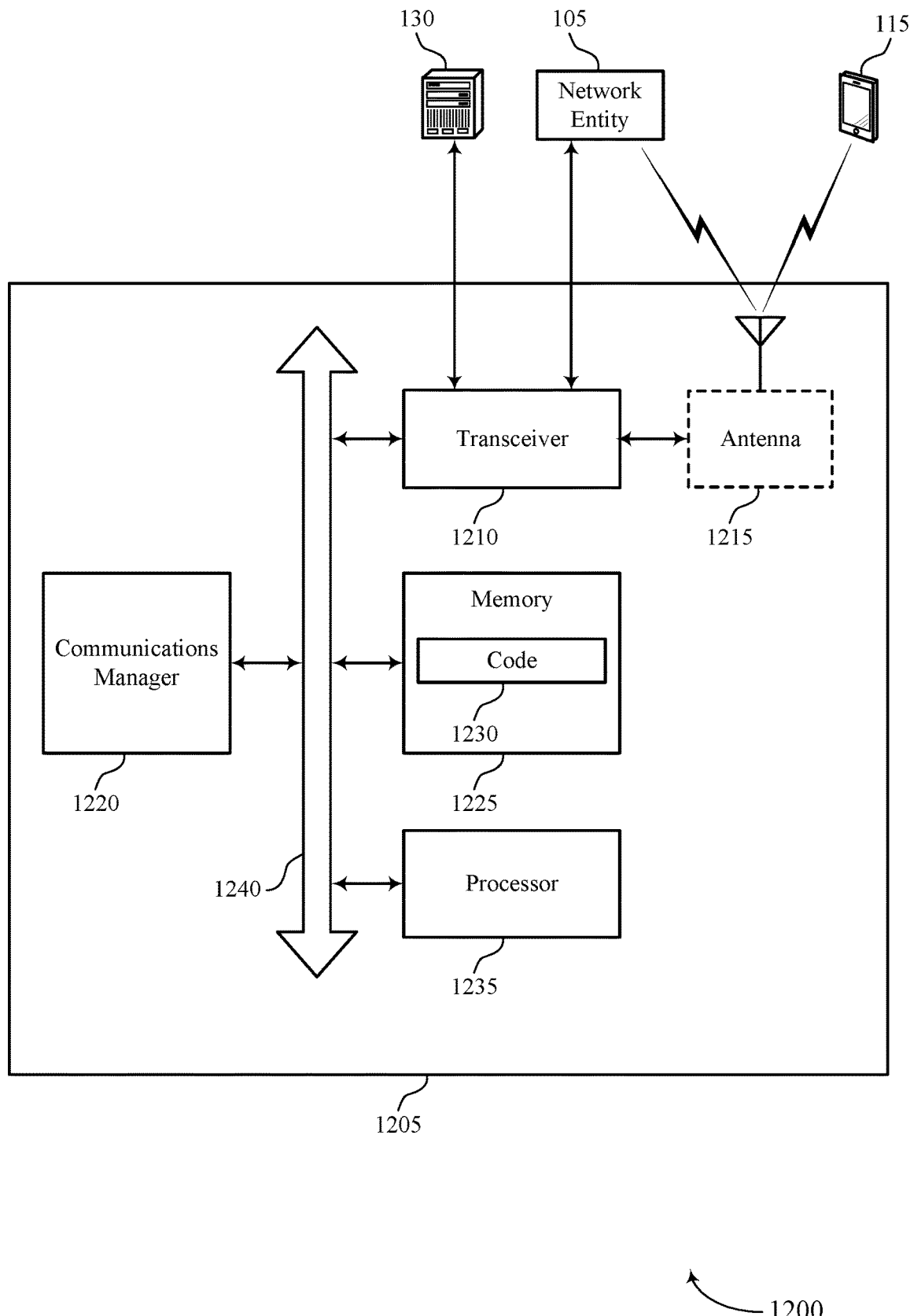
FIG. 12 shows a diagram of a system including a device that supports DMRS bundling in full-duplex operation in accordance with one or more aspects of the present disclosure.

FIG. 12 shows a diagram of a system 1200 including a device 1205 that supports DMRS bundling in full-duplex operation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting DMRS bundling in full-duplex operation). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for receiving an indication of a UE capability associated with maintaining phase continuity and power consistency for DMRS bundling between a full-duplex slot and a half-duplex slot. The communications manager 1220 may be configured as or otherwise support a means for receiving a first signal with a first set of DMRSs during a first slot of a first TDW associated with the DMRS bundling. The communications manager 1220 may be configured as or otherwise support a means for receiving, based on receiving the first signal during the first slot, a second signal with a second set of DMRSs during a second slot of the first TDW or of a second TDW associated with the DMRS bundling based on whether the phase continuity and the power consistency are maintained between the full-duplex slot and the half-duplex slot. The communications manager 1220 may be configured as or otherwise support a means for decoding the first signal and the second signal based on the first set of DMRSs and the second set of DMRSs in accordance with the DMRS bundling.

By including or configuring the communications manager 1220 in accordance with examples as described herein, the device 1205 may support techniques for improved coordination between devices by indicating when DMRS bundling can be supported in a system that employs multiple duplex operations. For example, these techniques may provide enhanced channel estimation using DMRS bundling in a system that supports SBFD and half-duplex operation by informing a network entity 105 how a UE 115 can support DMRS bundling.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of DMRS bundling in full-duplex operation as described herein, or the processor 1235 and the memory 1225 may be otherwise configured to perform or support such operations.

Figure 13:
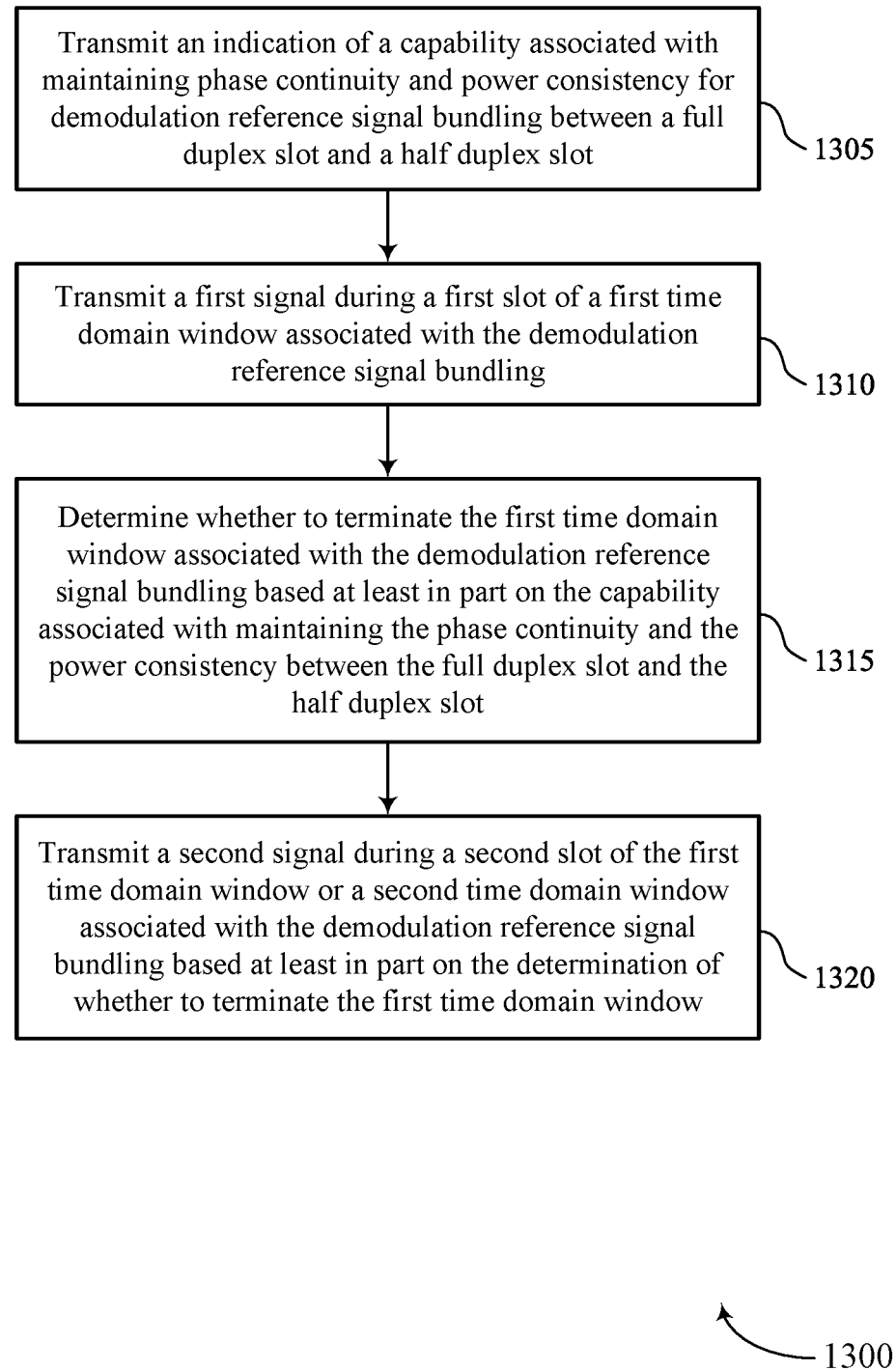
FIGS. 13 through 16 show flowcharts illustrating methods that support DMRS bundling in full-duplex operation in accordance with one or more aspects of the present disclosure.

FIG. 13 shows a flowchart illustrating a method 1300 that supports DMRS bundling in full-duplex operation in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting an indication of a capability associated with maintaining phase continuity and power consistency for DMRS bundling between a full-duplex slot and a half-duplex slot. The operations of 1305 may be performed in accordance with examples as disclosed herein. In some examples, aspects of the operations of 1305 may be performed by a capability component 725 as described with reference to FIG. 7.

At 1310, the method may include transmitting a first signal during a first slot of a first TDW associated with the DMRS bundling. The operations of 1310 may be performed in accordance with examples as disclosed herein. In some examples, aspects of the operations of 1310 may be performed by a DMRS bundling component 730 as described with reference to FIG. 7.

At 1315, the method may include determining whether to terminate the first TDW associated with the DMRS bundling based at least in part on the capability associated with maintaining the phase continuity and the power consistency between the full-duplex slot and the half-duplex slot. The operations of 1315 may be performed in accordance with examples as disclosed herein. In some examples, aspects of the operations of 1315 may be performed by an actual TDW determining component 735 as described with reference to FIG. 7.

At 1320, the method may include transmitting a second signal during a second slot of the first TDW or a second TDW associated with the DMRS bundling based at least in part on the determination of whether to terminate the first TDW. The operations of 1320 may be performed in accordance with examples as disclosed herein. In some examples, aspects of the operations of 1320 may be performed by a DMRS bundling component 730 as described with reference to FIG. 7.

Figure 14:
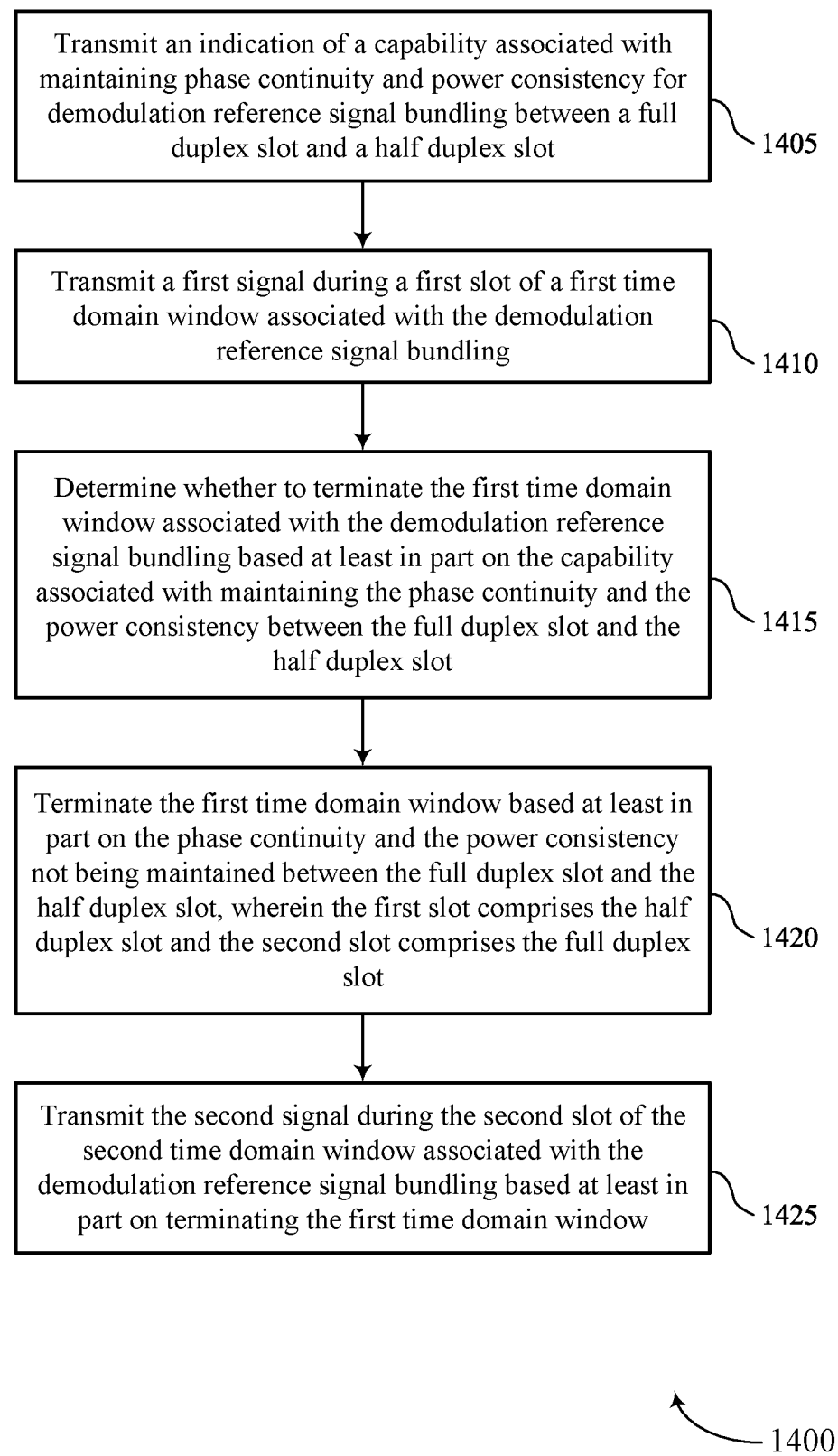

FIG. 14 shows a flowchart illustrating a method 1400 that supports DMRS bundling in full-duplex operation in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting an indication of a capability associated with maintaining phase continuity and power consistency for DMRS bundling between a full-duplex slot and a half-duplex slot. The operations of 1405 may be performed in accordance with examples as disclosed herein. In some examples, aspects of the operations of 1405 may be performed by a capability component 725 as described with reference to FIG. 7.

At 1410, the method may include transmitting a first signal during a first slot of a first TDW associated with the DMRS bundling. The operations of 1410 may be performed in accordance with examples as disclosed herein. In some examples, aspects of the operations of 1410 may be performed by a DMRS bundling component 730 as described with reference to FIG. 7.

At 1415, the method may include determining whether to terminate the first TDW associated with the DMRS bundling based at least in part on the capability associated with maintaining the phase continuity and the power consistency between the full-duplex slot and the half-duplex slot. The operations of 1415 may be performed in accordance with examples as disclosed herein. In some examples, aspects of the operations of 1415 may be performed by an actual TDW determining component 735 as described with reference to FIG. 7.

At 1420, the method may include terminating the first TDW based at least in part on the phase continuity and the power consistency not being maintained between the full-duplex slot and the half-duplex slot, wherein the first slot comprises the half-duplex slot and the second slot includes the full-duplex slot. The operations of 1420 may be performed in accordance with examples as disclosed herein. In some examples, aspects of the operations of 1420 may be performed by an actual TDW terminating component 740 as described with reference to FIG. 7.

At 1425, the method may include transmitting the second signal during the second slot of the second TDW associated with the DMRS bundling based at least in part on terminating the first TDW. The operations of 1425 may be performed in accordance with examples as disclosed herein. In some examples, aspects of the operations of 1425 may be performed by a DMRS bundling component 730 as described with reference to FIG. 7.

Figure 15:
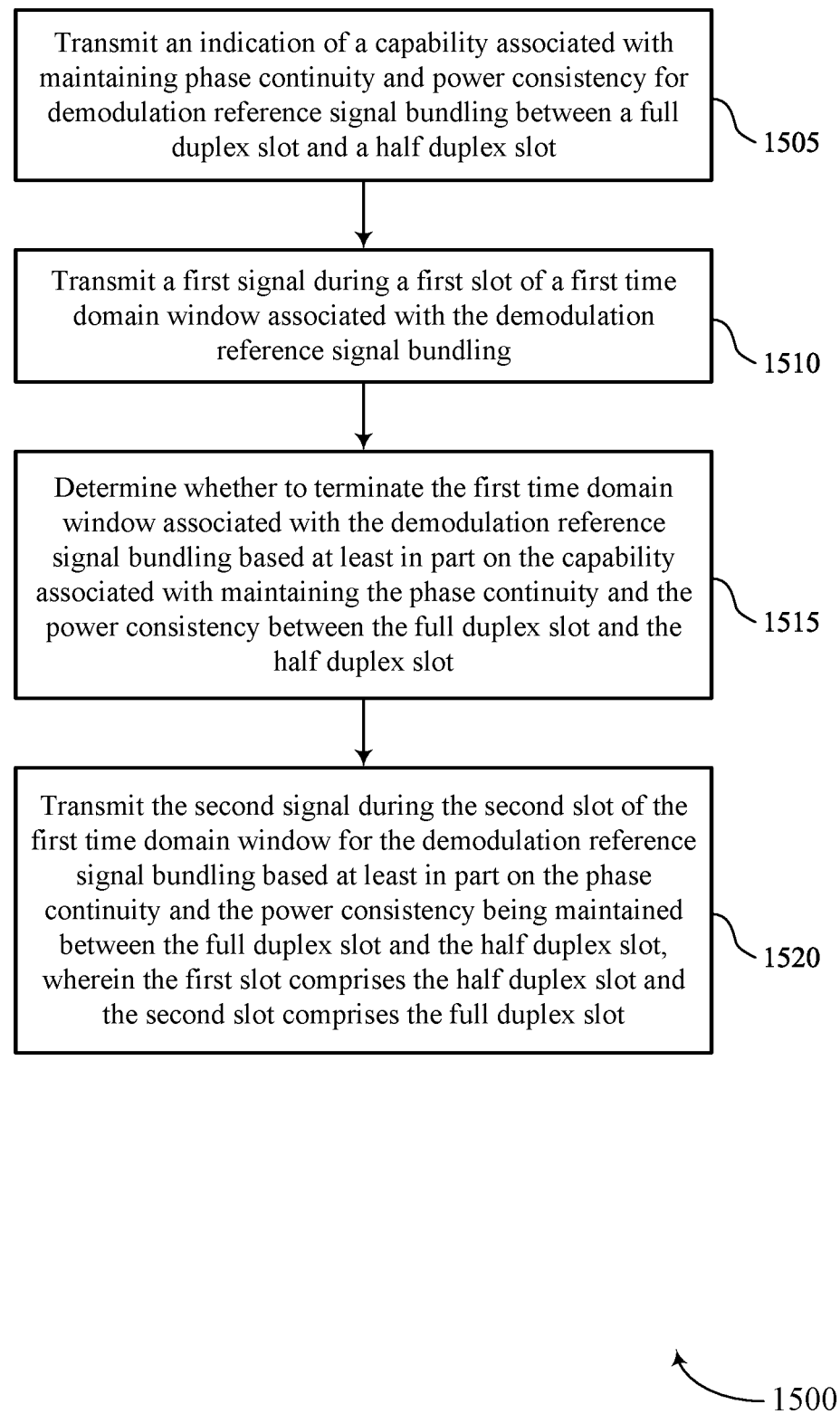

FIG. 15 shows a flowchart illustrating a method 1500 that supports DMRS bundling in full-duplex operation in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting an indication of a capability associated with maintaining phase continuity and power consistency for DMRS bundling between a full-duplex slot and a half-duplex slot. The operations of 1505 may be performed in accordance with examples as disclosed herein. In some examples, aspects of the operations of 1505 may be performed by a capability component 725 as described with reference to FIG. 7.

At 1510, the method may include transmitting a first signal during a first slot of a first TDW associated with the DMRS bundling. The operations of 1510 may be performed in accordance with examples as disclosed herein. In some examples, aspects of the operations of 1510 may be performed by a DMRS bundling component 730 as described with reference to FIG. 7.

At 1515, the method may include determining whether to terminate the first TDW associated with the DMRS bundling based at least in part on the capability associated with maintaining the phase continuity and the power consistency between the full-duplex slot and the half-duplex slot. The operations of 1515 may be performed in accordance with examples as disclosed herein. In some examples, aspects of the operations of 1515 may be performed by an actual TDW determining component 735 as described with reference to FIG. 7.

At 1520, the method may include transmitting the second signal during the second slot of the first TDW for the DMRS bundling based at least in part on the phase continuity and the power consistency being maintained between the full-duplex slot and the half-duplex slot, wherein the first slot comprises the full-duplex slot and the second slot includes the half-duplex slot. The operations of 1520 may be performed in accordance with examples as disclosed herein. In some examples, aspects of the operations of 1520 may be performed by a DMRS bundling component 730 as described with reference to FIG. 7.

Figure 16:
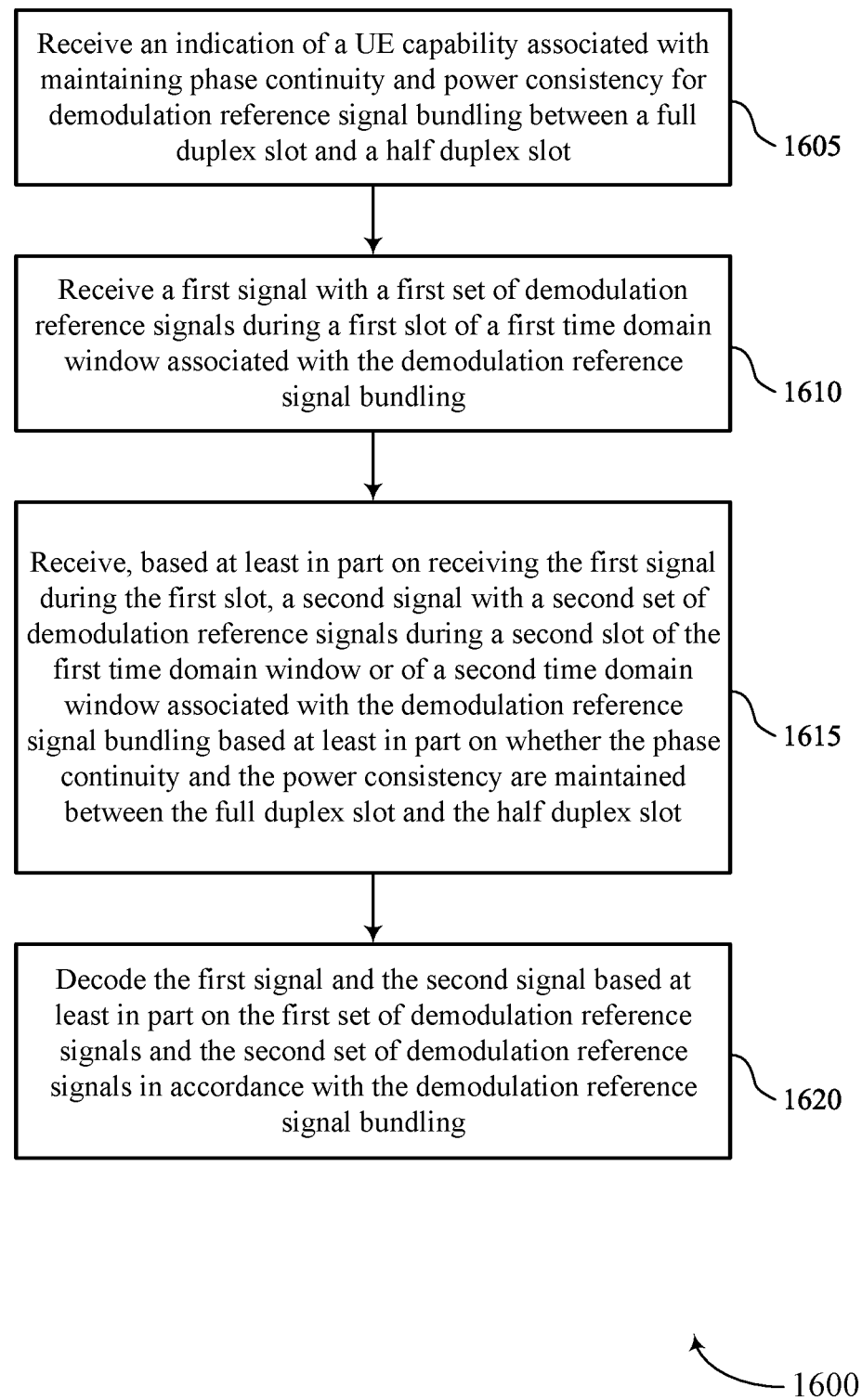

FIG. 16 shows a flowchart illustrating a method 1600 that supports DMRS bundling in full-duplex operation in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving an indication of a UE capability associated with maintaining phase continuity and power consistency for DMRS bundling between a full-duplex slot and a half-duplex slot. The operations of 1605 may be performed in accordance with examples as disclosed herein. In some examples, aspects of the operations of 1605 may be performed by a UE capability component 1125 as described with reference to FIG. 11.

At 1610, the method may include receiving a first signal with a first set of DMRSs during a first slot of a first TDW associated with the DMRS bundling. The operations of 1610 may be performed in accordance with examples as disclosed herein. In some examples, aspects of the operations of 1610 may be performed by a DMRS bundling reception component 1130 as described with reference to FIG. 11.

At 1615, the method may include receiving, based at least in part on receiving the first signal during the first slot, a second signal with a second set of DMRSs during a second slot of the first TDW or of a second TDW associated with the DMRS bundling based at least in part on whether the phase continuity and the power consistency are maintained between the full-duplex slot and the half-duplex slot. The operations of 1615 may be performed in accordance with examples as disclosed herein. In some examples, aspects of the operations of 1615 may be performed by a DMRS bundling reception component 1130 as described with reference to FIG. 11.

At 1620, the method may include decoding the first signal and the second signal based at least in part on the first set of DMRSs and the second set of DMRSs in accordance with the DMRS bundling. The operations of 1620 may be performed in accordance with examples as disclosed herein. In some examples, aspects of the operations of 1620 may be performed by a joint channel estimation component 1135 as described with reference to FIG. 11.

The following provides an overview of aspects of the present disclosure:

Aspect 1: A method for wireless communication at a UE, comprising: transmitting an indication of a capability associated with maintaining phase continuity and power consistency for demodulation reference signal bundling between a full-duplex slot and a half-duplex slot; transmitting a first signal during a first slot of a first time domain window associated with the demodulation reference signal bundling; determining whether to terminate the first time domain window associated with the demodulation reference signal bundling based at least in part on the capability associated with maintaining the phase continuity and the power consistency between the full-duplex slot and the half-duplex slot; and transmitting a second signal during a second slot of the first time domain window or a second time domain window associated with the demodulation reference signal bundling based at least in part on the determination of whether to terminate the first time domain window.

Aspect 2: The method of aspect 1, wherein transmitting the second signal during the second slot comprises: terminating the first time domain window based at least in part on the phase continuity and the power consistency not being maintained between the full-duplex slot and the half-duplex slot; and transmitting the second signal during the second slot of the second time domain window associated with the demodulation reference signal bundling based at least in part on terminating the first time domain window.

Aspect 3: The method of any of aspects 1 through 2, wherein transmitting the second signal during the second slot comprises: terminating the first time domain window based at least in part on the phase continuity and the power consistency not being maintained between the full-duplex slot and the half-duplex slot, wherein the first slot comprises the half-duplex slot and the second slot comprises the full-duplex slot; and transmitting the second signal during the second slot of the second time domain window associated with the demodulation reference signal bundling based at least in part on terminating the first time domain window.

Aspect 4: The method of any of aspects 1 through 3, wherein transmitting the second signal during the second slot comprises: transmitting the second signal during the second slot of the first time domain window for the demodulation reference signal bundling based at least in part on the phase continuity and the power consistency being maintained between the full-duplex slot and the half-duplex slot, wherein the first slot comprises the full-duplex slot and the second slot comprises the half-duplex slot.

Aspect 5: The method of any of aspects 1 through 4, wherein transmitting the second signal during the second slot comprises: transmitting the second signal during the second slot of the first time domain window for the demodulation reference signal bundling based at least in part on phase continuity and power consistency being maintained between the full-duplex slot and the half-duplex slot.

Aspect 6: The method of any of aspects 1 through 5, wherein transmitting the second signal during the second slot comprises: terminating the first time domain window based at least in part on frequency domain resources of the full-duplex slot being near an edge of a bandwidth part, wherein phase continuity and power consistency are not maintained based at least in part on the frequency domain resources being located at a position of the bandwidth part that is closer to a frequency edge of the bandwidth part than other bandwidths of the bandwidth part; and transmitting the second signal during the second slot of the second time domain window for the demodulation reference signal bundling based at least in part on terminating the first time domain window.

Aspect 7: The method of any of aspects 1 through 6, wherein transmitting the second signal during the second slot comprises: terminating the first time domain window based at least in part on frequency domain resources of the first slot or the second slot being near an edge of a bandwidth part, wherein phase continuity and power consistency are not maintained based at least in part on the frequency domain resources being located at a position of the bandwidth part that is closer to a frequency edge of the bandwidth part than other bandwidths of the bandwidth part; and transmitting the second signal during the second slot of the second time domain window for the demodulation reference signal bundling based at least in part on terminating the first time domain window.

Aspect 8: The method of any of aspects 1 through 7, wherein transmitting the second signal during the second slot comprises: terminating the first time domain window based at least in part on the full-duplex slot corresponding to a first frequency hop and the half-duplex slot corresponding to a second frequency hop, wherein phase continuity and power consistency are not maintained between the first frequency hop and the second frequency hop; and transmitting the second signal during the second slot of the second time domain window for the demodulation reference signal bundling based at least in part on terminating the first time domain window.

Aspect 9: The method of any of aspects 1 through 8, wherein transmitting the second signal during the second slot comprises: transmitting the second signal during the first slot of the second time domain window for the demodulation reference signal bundling based at least in part on a time gap between the first slot and the second slot satisfying a threshold, wherein the phase continuity and the power consistency are maintained across the time gap.

Aspect 10: The method of any of aspects 1 through 9, wherein transmitting the indication of the capability comprises: indicating a capability to support maintaining phase continuity and power consistency for the demodulation reference signal bundling from the full-duplex slot to the half-duplex slot or from the half-duplex slot to the full-duplex slot, or both.

Aspect 11: The method of any of aspects 1 through 10, wherein transmitting the indication of the capability comprises: transmitting the indication of the capability when connecting to a network entity.

Aspect 12: The method of any of aspects 1 through 11, wherein the full-duplex slot is a sub-band full-duplex slot including one or more sub-bands of a component carrier bandwidth for uplink communication and one or more sub-bands of the component carrier bandwidth for downlink communications in a same slot.

Aspect 13: The method of any of aspects 1 through 12, wherein a component carrier bandwidth during the half-duplex slot includes uplink communications.

Aspect 14: The method of any of aspects 1 through 13, wherein the first time domain window is a first actual time domain window, and the second time domain window is a second actual time domain window, any plurality of transmissions within an actual time domain window maintain phase continuity and power consistency across the plurality of transmissions.

Aspect 15: The method of any of aspects 1 through 14, wherein a first set of one or more demodulation reference signals in the first signal and a second set of one or more demodulation reference signals in the second signal are configured for joint channel estimation based at least in part on the demodulation reference signal bundling.

Aspect 16: A method for wireless communication at a network entity, comprising: receiving an indication of a UE capability associated with maintaining phase continuity and power consistency for demodulation reference signal bundling between a full-duplex slot and a half-duplex slot; receiving a first signal with a first set of demodulation reference signals during a first slot of a first time domain window associated with the demodulation reference signal bundling; receiving, based at least in part on receiving the first signal during the first slot, a second signal with a second set of demodulation reference signals during a second slot of the first time domain window or of a second time domain window associated with the demodulation reference signal bundling based at least in part on whether the phase continuity and the power consistency are maintained between the full-duplex slot and the half-duplex slot; and decoding the first signal and the second signal based at least in part on the first set of demodulation reference signals and the second set of demodulation reference signals in accordance with the demodulation reference signal bundling.

Aspect 17: The method of aspect 16, wherein receiving the second signal during the second slot comprises: receiving the second signal during the second slot of the second time domain window associated with the demodulation reference signal bundling based at least in part on the phase continuity and the power consistency not being maintained between the full-duplex slot and the half-duplex slot.

Aspect 18: The method of any of aspects 16 through 17, wherein receiving the second signal during the second slot comprises: receiving the second signal during the second slot of the second time domain window associated with the demodulation reference signal bundling based at least in part on the phase continuity and the power consistency not being maintained between the full-duplex slot and the half-duplex slot, wherein the first slot comprises the half-duplex slot and the second slot comprises the full-duplex slot.

Aspect 19: The method of any of aspects 16 through 18, wherein receiving the second signal during the second slot comprises: receiving the second signal during the second slot of the first time domain window for the demodulation reference signal bundling based at least in part on the phase continuity and the power consistency being maintained between the full-duplex slot and the half-duplex slot, wherein the first slot comprises the full-duplex slot and the second slot comprises the half-duplex slot.

Aspect 20: The method of any of aspects 16 through 19, wherein receiving the second signal during the second slot comprises: receiving the second signal during the second slot of the first time domain window for the demodulation reference signal bundling based at least in part on phase continuity and power consistency being maintained between the full-duplex slot and the half-duplex slot.

Aspect 21: The method of any of aspects 16 through 20, wherein receiving the second signal during the second slot comprises: receiving the second signal during the second slot of the second time domain window for the demodulation reference signal bundling based at least in part on frequency domain resources of the full-duplex slot being near an edge of a bandwidth part, wherein phase continuity and power consistency are not maintained based at least in part on the frequency domain resources being located at a position of the bandwidth part that is closer to a frequency edge of the bandwidth part than other bandwidths of the bandwidth part.

Aspect 22: The method of any of aspects 16 through 21, wherein receiving the second signal during the second slot comprises: receiving the second signal during the second slot of the second time domain window for the demodulation reference signal bundling based at least in part on frequency domain resources of the first slot or the second slot being near an edge of a bandwidth part, wherein phase continuity and power consistency are not maintained based at least in part on the frequency domain resources being located at a position of the bandwidth part that is closer to a frequency edge of the bandwidth part than other bandwidths of the bandwidth part.

Aspect 23: The method of any of aspects 16 through 22, wherein receiving the second signal during the second slot comprises: receiving the second signal during the second slot of the second time domain window for the demodulation reference signal bundling based at least in part on the full-duplex slot corresponding to a first frequency hop and the half-duplex slot corresponding to a second frequency hop, wherein phase continuity and power consistency are not maintained between the first frequency hop and the second frequency hop.

Aspect 24: The method of any of aspects 16 through 23, wherein receiving the second signal during the second slot comprises: receiving the second signal during the second slot of the first time domain window for the demodulation reference signal bundling based at least in part on a time gap between the first slot and the second slot satisfying a threshold, wherein the phase continuity and the power consistency are maintained across the time gap.

Aspect 25: The method of any of aspects 16 through 24, wherein receiving the indication of the UE capability comprises: receiving an indication of a capability of a UE to support maintaining phase continuity and power consistency for the demodulation reference signal bundling from the full-duplex slot to the half-duplex slot or from the half-duplex slot to the full-duplex slot, or both.

Aspect 26: The method of any of aspects 16 through 25, wherein receiving the indication of the UE capability comprises: receiving the indication of the UE capability when a UE connects to the network entity.

Aspect 27: The method of any of aspects 16 through 26, wherein the full-duplex slot is a sub-band full-duplex slot including one or more sub-bands of a component carrier bandwidth for uplink communication and one or more sub-bands of the component carrier bandwidth for downlink communications in a same slot.

Aspect 28: The method of any of aspects 16 through 27, wherein the first time domain window is a first actual time domain window, and the second time domain window is a second actual time domain window, any plurality of transmissions within an actual time domain window maintain phase continuity and power consistency across the plurality of transmissions.

Aspect 29: An apparatus for wireless communication at a UE, comprising a processor; and a memory coupled with the processor, wherein the memory comprises instructions executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a network entity, comprising a processor; and a memory coupled with the processor, wherein the memory comprises instructions executable by the processor to cause the apparatus to perform a method of any of aspects 16 through 28.

Aspect 33: An apparatus for wireless communication at a network entity, comprising at least one means for performing a method of any of aspects 16 through 28.

Aspect 34: A non-transitory computer-readable medium storing code for wireless communication at a network entity, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting an indication of a capability associated with maintaining phase continuity and power consistency for demodulation reference signal bundling between a full-duplex slot and a half-duplex slot;
   transmitting a first signal during a first slot of a first time domain window associated with the demodulation reference signal bundling;
   determining whether to terminate the first time domain window associated with the demodulation reference signal bundling based at least in part on the capability associated with maintaining the phase continuity and the power consistency between the full-duplex slot and the half-duplex slot; and transmitting a second signal during a second slot of the first time domain window or a second time domain window associated with the demodulation reference signal bundling based at least in part on the determination of whether to terminate the first time domain window.

2. The method of claim 1, wherein transmitting the second signal during the second slot comprises:
terminating the first time domain window based at least in part on the phase continuity and the power consistency not being maintained between the full-duplex slot and the half-duplex slot; and
transmitting the second signal during the second slot of the second time domain window associated with the demodulation reference signal bundling based at least in part on terminating the first time domain window.

3. The method of claim 1, wherein transmitting the second signal during the second slot comprises:
terminating the first time domain window based at least in part on the phase continuity and the power consistency not being maintained between the full-duplex slot and the half-duplex slot, wherein the first slot comprises the half-duplex slot and the second slot comprises the full-duplex slot; and
transmitting the second signal during the second slot of the second time domain window associated with the demodulation reference signal bundling based at least in part on terminating the first time domain window.

4. The method of claim 1, wherein transmitting the second signal during the second slot comprises:
transmitting the second signal during the second slot of the first time domain window for the demodulation reference signal bundling based at least in part on the phase continuity and the power consistency being maintained between the full-duplex slot and the half-duplex slot, wherein the first slot comprises the full-duplex slot and the second slot comprises the half-duplex slot.

5. The method of claim 1, wherein transmitting the second signal during the second slot comprises:
transmitting the second signal during the second slot of the first time domain window for the demodulation reference signal bundling based at least in part on the phase continuity and the power consistency being maintained between the full-duplex slot and the half-duplex slot.

6. The method of claim 1, wherein transmitting the second signal during the second slot comprises:
terminating the first time domain window based at least in part on allocated frequency domain resources of the full-duplex slot being near an edge of a bandwidth part, wherein the phase continuity and the power consistency are not maintained based at least in part on the allocated frequency domain resources being located at a position of the bandwidth part that is closer to a frequency edge of the bandwidth part than other bandwidths of the bandwidth part; and
transmitting the second signal during the second slot of the second time domain window for the demodulation reference signal bundling based at least in part on terminating the first time domain window.

7. The method of claim 1, wherein transmitting the second signal during the second slot comprises:
terminating the first time domain window based at least in part on allocated frequency domain resources of the first slot or the second slot being near an edge of a bandwidth part, wherein the phase continuity and the power consistency are not maintained based at least in part on the allocated frequency domain resources being located at a position of the bandwidth part that is closer to a frequency edge of the bandwidth part than other bandwidths of the bandwidth part; and
transmitting the second signal during the second slot of the second time domain window for the demodulation reference signal bundling based at least in part on terminating the first time domain window.

8. The method of claim 1, wherein transmitting the second signal during the second slot comprises:
terminating the first time domain window based at least in part on the full-duplex slot corresponding to a first frequency hop and the half-duplex slot corresponding to a second frequency hop, wherein the phase continuity and the power consistency are not maintained between the first frequency hop and the second frequency hop; and
transmitting the second signal during the second slot of the second time domain window for the demodulation reference signal bundling based at least in part on terminating the first time domain window.

9. The method of claim 1, wherein transmitting the second signal during the second slot comprises:
transmitting the second signal during the second slot of the first time domain window for the demodulation reference signal bundling based at least in part on a time gap between the first slot and the second slot satisfying a threshold, wherein the phase continuity and the power consistency are maintained across the time gap.

10. The method of claim 1, wherein transmitting the indication of the capability comprises:
indicating a capability to support maintaining the phase continuity and the power consistency for the demodulation reference signal bundling from the full-duplex slot to the half-duplex slot or from the half-duplex slot to the full-duplex slot, or both.

11. The method of claim 1, wherein transmitting the indication of the capability comprises:
transmitting the indication of the capability when connecting to a network entity.

12. The method of claim 1, wherein the full-duplex slot is a sub-band full-duplex slot including one or more sub-bands of a component carrier bandwidth for uplink communication and one or more sub-bands of the component carrier bandwidth for downlink communications in a same slot.

13. The method of claim 1, wherein a component carrier bandwidth during the half-duplex slot includes uplink communications.

14. The method of claim 1, wherein the first time domain window is a first actual time domain window, the second time domain window is a second actual time domain window, wherein any plurality of transmissions within an actual time domain window maintain phase continuity and power consistency across the plurality of transmissions.

15. The method of claim 1, wherein a first set of one or more demodulation reference signals in the first signal and a second set of one or more demodulation reference signals in the second signal are a same demodulation reference signal for channel estimation based at least in part on the demodulation reference signal bundling.

16. A method for wireless communication at a network entity, comprising:

receiving an indication of a user equipment (UE) capability associated with maintaining phase continuity and power consistency for demodulation reference signal bundling between a full-duplex slot and a half-duplex slot;

receiving a first signal with a first set of demodulation reference signals during a first slot of a first time domain window associated with the demodulation reference signal bundling;

receiving, based at least in part on receiving the first signal during the first slot, a second signal with a second set of demodulation reference signals during a second slot of the first time domain window or of a second time domain window associated with the demodulation reference signal bundling based at least in part on whether the phase continuity and the power consistency are maintained between the full-duplex slot and the half-duplex slot; and decoding the first signal and the second signal based at least in part on the first set of demodulation reference signals and the second set of demodulation reference signals in accordance with the demodulation reference signal bundling.

17. The method of claim 16, wherein receiving the second signal during the second slot comprises:

receiving the second signal during the second slot of the second time domain window associated with the demodulation reference signal bundling based at least in part on the phase continuity and the power consistency not being maintained between the full-duplex slot and the half-duplex slot.

18. The method of claim 16, wherein receiving the second signal during the second slot comprises:

receiving the second signal during the second slot of the second time domain window associated with the demodulation reference signal bundling based at least in part on the phase continuity and the power consistency not being maintained between the full-duplex slot and the half-duplex slot, wherein the first slot comprises the half-duplex slot and the second slot comprises the full-duplex slot.

19. The method of claim 16, wherein receiving the second signal during the second slot comprises:

receiving the second signal during the second slot of the first time domain window for the demodulation reference signal bundling based at least in part on the phase continuity and the power consistency being maintained between the full-duplex slot and the half-duplex slot, wherein the first slot comprises the full-duplex slot and the second slot comprises the half-duplex slot.

20. The method of claim 16, wherein receiving the second signal during the second slot comprises:

receiving the second signal during the second slot of the first time domain window for the demodulation reference signal bundling based at least in part on the phase continuity and the power consistency being maintained between the full-duplex slot and the half-duplex slot.

21. The method of claim 16, wherein receiving the second signal during the second slot comprises:

receiving the second signal during the second slot of the second time domain window for the demodulation reference signal bundling based at least in part on allocated frequency domain resources of the full-duplex slot being near an edge of a bandwidth part, wherein the phase continuity and the power consistency are not maintained based at least in part on the allocated frequency domain resources being located at a position of the bandwidth part that is closer to a frequency edge of the bandwidth part than other bandwidths of the bandwidth part.

22. The method of claim 16, wherein receiving the second signal during the second slot comprises:

receiving the second signal during the second slot of the second time domain window for the demodulation reference signal bundling based at least in part on allocated frequency domain resources of the first slot or the second slot being near an edge of a bandwidth part, wherein the phase continuity and the power consistency are not maintained based at least in part on the allocated frequency domain resources being located at a position of the bandwidth part that is closer to a frequency edge of the bandwidth part than other bandwidths of the bandwidth part.

23. The method of claim 16, wherein receiving the second signal during the second slot comprises:

receiving the second signal during the second slot of the second time domain window for the demodulation reference signal bundling based at least in part on the full-duplex slot corresponding to a first frequency hop and the half-duplex slot corresponding to a second frequency hop, wherein the phase continuity and the power consistency are not maintained between the first frequency hop and the second frequency hop.

24. The method of claim 16, wherein receiving the second signal during the second slot comprises:

receiving the second signal during the second slot of the first time domain window for the demodulation reference signal bundling based at least in part on a time gap between the first slot and the second slot satisfying a threshold, wherein the phase continuity and the power consistency are maintained across the time gap.

25. The method of claim 16, wherein receiving the indication of the UE capability comprises:

receiving an indication of a capability of a UE to support maintaining the phase continuity and the power consistency for the demodulation reference signal bundling from the full-duplex slot to the half-duplex slot or from the half-duplex slot to the full-duplex slot, or both.

26. The method of claim 16, wherein receiving the indication of the UE capability comprises:

receiving the indication of the UE capability when a UE connects to the network entity.

27. The method of claim 16, wherein the full-duplex slot is a sub-band full-duplex slot including one or more sub-bands of a component carrier bandwidth for uplink communication and one or more sub-bands of the component carrier bandwidth for downlink communications in a same slot.

28. The method of claim 16, wherein the first time domain window is a first actual time domain window, the second time domain window is a second actual time domain window, wherein any plurality of transmissions within an actual time domain window maintain phase continuity and power consistency across the plurality of transmissions.

29. An apparatus for wireless communication at a user equipment (UE), comprising:

a processor; and a memory coupled with the processor, wherein the memory comprises instructions executable by the processor to cause the apparatus to:

transmit an indication of a capability associated with maintaining phase continuity and power consistency for demodulation reference signal bundling between a full-duplex slot and a half-duplex slot;

transmit a first signal during a first slot of a first time domain window associated with the demodulation reference signal bundling;

determine whether to terminate the first time domain window associated with the demodulation reference signal bundling based at least in part on the capability associated with maintaining the phase continuity and the power consistency between the full-duplex slot and the half-duplex slot; and transmit a second signal during a second slot of the first time domain window or a second time domain window associated with the demodulation reference signal bundling based at least in part on the determination of whether to terminate the first time domain window.

30. An apparatus for wireless communication at a network entity, comprising:

a processor; and a memory coupled with the processor, wherein the memory comprises instructions executable by the processor to cause the apparatus to:

receive an indication of a user equipment (UE) capability associated with maintaining phase continuity and power consistency for demodulation reference signal bundling between a full-duplex slot and a half-duplex slot;

receive a first signal with a first set of demodulation reference signals during a first slot of a first time domain window associated with the demodulation reference signal bundling;

receive, based at least in part on receiving the first signal during the first slot, a second signal with a second set of demodulation reference signals during a second slot of the first time domain window or of a second time domain window associated with the demodulation reference signal bundling based at least in part on whether the phase continuity and the power consistency are maintained between the full-duplex slot and the half-duplex slot; and decode the first signal and the second signal based at least in part on the first set of demodulation reference signals and the second set of demodulation reference signals in accordance with the demodulation reference signal bundling.

* * * * *